(12) United States Patent
Carrozza et al.

(10) Patent No.: US 6,538,055 B1
(45) Date of Patent: Mar. 25, 2003

(54) POLYSILANE STABITIZERS CONTAINING STERICALLY HINDERED AMINE GROUPS

(75) Inventors: Primo Carrozza, Verona (IT); Valerio Borzatta, Bologna (IT); Giovanni Da Roit, Sasso Marconi (IT); Chryssostomos Chatgilialoglu, Bologna (IT)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/959,171

(22) PCT Filed: Apr. 17, 2000

(86) PCT No.: PCT/EP00/03454
§ 371 (c)(1),
(2), (4) Date: Oct. 18, 2001

(87) PCT Pub. No.: WO00/64965
PCT Pub. Date: Nov. 2, 2000

(30) Foreign Application Priority Data

Apr. 27, 1999 (EP) .............................. 99810353
Apr. 27, 1999 (EP) .............................. 99810354

(51) Int. Cl.$^7$ .............................. C08K 5/544
(52) U.S. Cl. .................. 524/268; 524/266; 525/100; 528/27; 528/28; 556/401; 556/413; 556/424; 556/430; 556/431
(58) Field of Search ............ 528/27, 28; 525/100; 524/266, 268; 556/401, 413, 424, 430, 431

(56) References Cited

U.S. PATENT DOCUMENTS

| 4,234,700 A | | 11/1980 | Rody et al. ............... 525/55 |
| 4,859,759 A | * | 8/1989 | Maycock et al. .......... 528/27 |
| 4,927,898 A | * | 5/1990 | King et al. ................ 528/27 |
| 5,134,233 A | | 7/1992 | Cantatore et al. ......... 544/198 |
| 5,216,103 A | * | 6/1993 | Costanzi et al. .......... 528/14 |
| 5,219,905 A | | 6/1993 | Carrozza et al. .......... 524/102 |
| 5,514,738 A | | 5/1996 | Borzatta et al. .......... 524/102 |
| 5,561,179 A | | 10/1996 | Borzatta et al. .......... 524/99 |
| 5,710,240 A | * | 1/1998 | Steinmann ............... 528/289 |
| 5,726,226 A | | 3/1998 | Borzatta et al. .......... 524/102 |
| 6,005,036 A | * | 12/1999 | Carrozza et al. .......... 524/265 |

FOREIGN PATENT DOCUMENTS

| EP | 0 491 659 | 6/1992 |
| GB | 2 295 619 | 6/1996 |
| WO | 97/02322 | 1/1997 |

OTHER PUBLICATIONS

Chatgilialoglu et al., Organometallics 1998, vol. 17, pp. 2169–2176.

* cited by examiner

Primary Examiner—Robert Dawson
Assistant Examiner—Marc S. Zimmer
(74) Attorney, Agent, or Firm—David R. Crichton

(57) ABSTRACT

A compound containing a silane backbone and a group of formula (A) wherein R is hydrogen, $C_1$–$C_8$alkyl, —O, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl; is useful for stabilizing an organic material against degradation induced by light, heat or oxidation.

18 Claims, No Drawings

POLYSILANE STABILIZERS CONTAINING STERICALLY HINDERED AMINE GROUPS

The present invention relates to compounds containing a polysilane backbone and 2,2,6,6-tetramethyl-4-piperidyl groups, to their use as light stabilizers, heat stabilizers and oxidation stabilizers for organic materials, particularly synthetic polymers, and to the organic materials thus stabilized.

Stabilizers containing a polysiloxane backbone and 2,2,6,6-tetramethyl-4-piperidyl groups are described for example in U.S. Pat. Nos. 4,234,700, 5,134,233, 5,219,905, 5,514,738, 5,561,179, GB-A-2,295,619 and U.S. Pat. No. 5,726,226. Some polysilane stabilizers are disclosed in EP-A-836,635. The autoxidation of poly(hydrosilane)s is described by C. Chatgilialoglu et al. in Organometallics 1998,17, 216914 2176.

In more detail, the present invention relates to a compound containing a polysilane backbone with more than two Si atoms and a group of the formula

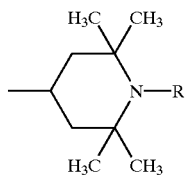

wherein R is hydrogen, $C_1$–$C_8$alkyl, —O·, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl.

The backbone corresponds for example to the formula

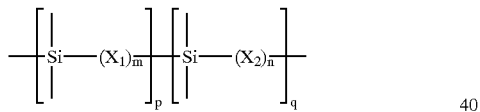

with $X_1$, $X_2$, m, n, p and q as defined below.

A backbone which contains only Si atoms (m and n are zero) is especially preferred.

The present invention relates in particular to a compound of the formula (I)

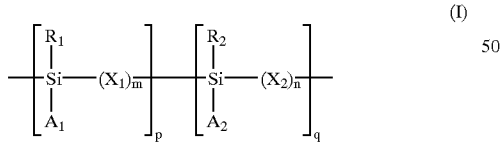

in which
p is a number from 2 to 100 and q is zero or a number from 2 to 90;
m and n independently of one another are zero or 1;
$R^1$ and $R_2$ independently of one another are a group of the formula (II) or (III) as defined below, or hydrogen, $C_1$–$C_{18}$alkyl, $C_5$–$C_{12}$cycloalkyl unsubstituted or substituted by 1, 2 or 3 $C_1$–$C_4$alkyl or $C_1$–$C_4$alkoxy; phenyl unsubstituted or substituted by 1, 2 or 3 $C_1$–$C_4$alkyl or $C_1$–$C_4$alkoxy; $C_7$–$C_9$phenylalkyl unsubstituted or substituted on the phenyl by 1, 2 or 3 $C_1$–$C_4$alkyl or $C_1$–$C_4$alkoxy;

$X_1$ and $X_2$ independently of one another are $C_2$–$C_{12}$alkylene;

$A_1$ is a group of the formula (II) or (III)

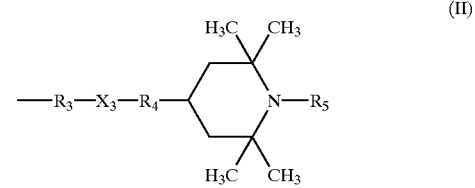

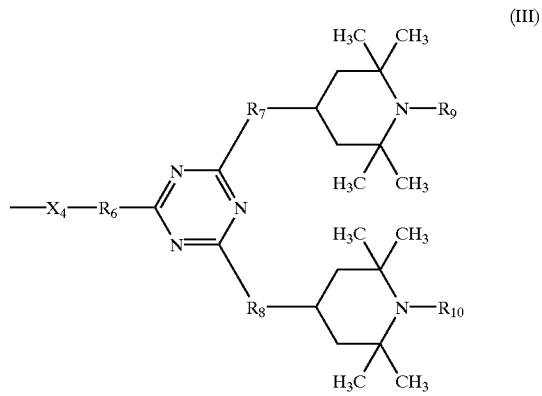

wherein
$R_3$ is a direct bond or $C_1$–$C_{12}$alkylene,
$R_4$, $R_6$, $R_7$ and $R_8$ independently of one another are —O— or >N—$R_{11}$ with $R_{11}$ being hydrogen, $C_1$–$C_8$alkyl, $C_5$–$C_{12}$cycloalkyl or a group of the formula (IV),

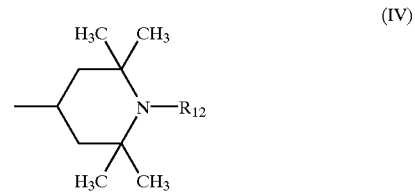

$R_5$, $R_9$, $R_{10}$ and $R_{12}$ independently of one another are hydrogen, $C_1$–$C_8$alkyl, —O·, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl ; or $C_1$–$C_8$acyl,
$X_3$ is a direct bond or >C=O, and
$X_4$ is $C_2$–$C_{12}$alkylene;
$A_2$ is a group of the formula (II) or (III), or hydrogen, $C_1$–$C_{12}$alkyl, $C_5$–$C_2$cycloalkyl unsubstituted or substituted by 1, 2 or 3 $C_1$–$C_4$alkyl or $C_1$–$C_4$alkoxy; and each of the radicals $R_1$, $R_2$, $X_1$, $X_2$, $A_1$ and $A_2$ as well as each of the variables m and n can have the same or a different meaning in the individual recurring units of the formula (I); and when the compounds of the formula (I) are copolymeric, they can have a random, alternate or block distribution of the individual recurring units.

One of the preferred embodiments of the present invention relates to a compound of the formula (I) wherein the structural unit of the formula (A)

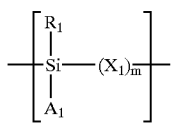

(A)

is different from the structural unit of the formula (B).

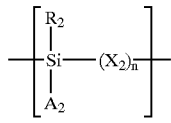

(B)

Example of alkyl containing up to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl. One of the preferred meanings of $R_1$ and $R_2$ is $C_1$–$C_{12}$alkyl. One of the preferred meanings of $R_5$, $R_9$, $R_{10}$ and $R_{12}$ is $C_1$–$C_4$alkyl, in particular methyl. One of the preferred meanings of $R_{11}$ is $C_1$–$C_4$alkyl.

Examples of alkoxy containing not more than 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_6$–$C_{12}$Alkoxy, in particular heptoxy or octoxy, is one of the preferred meanings of $R_5$, $R_9$, $R_{10}$ and $R_{12}$.

Examples of alkenyl containing not more than 6 carbon atoms are allyl, 2-methylallyl, butenyl and hexenyl. Alkenyls in which the carbon atom in the 1-position is saturated are preferred, and allyl is particularly preferred.

Examples of $C_5$–$C_{12}$cycloalkyl unsubstituted or substituted by 1, 2 or 3 $C_1$–$C_4$alkyl or $C_1$–$C_4$alkoxy are cyclopentyl, methylcyclopentyl, dimethylcyclopentyl, cyclohexyl, methylcyclohexyl, methoxycyclohexyl, dimethylcyclohexyl, trimethylcyclohexyl, t-butylcyclohexyl, cyclooctyl, cyclodecyl and cyclododecyl. Cyclohexyl is preferred.

Examples of $C_5$–$C_{12}$cycloalkoxy are cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

Examples of phenyl substituted by 1, 2 or 3 $C_1$–$C_4$alkyl or $C_1$–$C_4$alkoxy are methylphenyl, dimethylphenyl, trimethylphenyl, t-butylphenyl, di-t-butylphenyl, 3,5-di-t-butyl-4-methylphenyl, methoxyphenyl, ethoxyphenyl and butoxyphenyl.

Examples of $C_7$–$C_9$phenylalkyl unsubstituted or substituted on the phenyl by 1. 2 or 3 $C_1$–$C_4$alkyl or $C_1$–$C_4$alkoxy are benzyl, methylbenzyl, methoxybenzyl, dimethylbenzyl, trimethylbenzyl, t-butylbenzyl and 2-phenylethyl. Benzyl is preferred.

Examples of acyl (aliphatic, cycloaliphatic or aromatic) containing not more than 8 carbon atoms are formyl, acetyl, propionyl, butyryl, pentanoyl, hexanoyl, heptanoyl and octanoyl. $C_1$–$C_8$Alkanoyl and benzoyl are preferred. Acetyl is especially preferred.

Examples of alkylene containing not more than 12 carbon atoms are ethylene, propylene, trimethylene, tetramethylene, pentamethylene, hexamethylene, octamethylene, decamethylene and dodecamethylene. $R_3$ and $X_4$ are preferably $C_2$–$C_{10}$alkylene. $C_3$–$C_{10}$alkylene is a particularly preferred meaning of $R_3$ and $X_4$.

p is preferably a number from 2 to 50, in particular 2 to 20. q is preferably zero or a number from 2 to 45, in particular 2 to 18. According to a particularly preferred embodiment, q varies from 0 to 90% of the sum of p+q. The p:q molar ratio is for example 1:9 to 9:1 or 1:4 to 4:1 or 1:2 to 2:1.

$R_1$ and $R_2$ independently of one another may be for example $C_1$–$C_{18}$alkyl, $C_5$–$C_{12}$cycloalkyl unsubstituted or substituted by 1, 2 or 3 $C_1$–$C_4$alkyl or $C_1$–$C_4$alkoxy; phenyl unsubstituted or substituted by 1, 2 or 3 $C_1$–$C_4$alkyl or $C_1$–$C_4$alkoxy; $C_7$–$C_9$phenylalkyl unsubstituted or substituted on the phenyl by 1, 2 or 3 $C_1$–$C_4$alkyl or $C_1$–$C_4$alkoxy; and $A_2$ may be for example hydrogen, $C_1$–$C_{12}$alkyl, $C_5$–$C_{12}$cycloalkyl unsubstituted or substituted by 1, 2 or 3 $C_1$–$C_4$alkyl or $C_1$–$C_4$alkoxy.

$R_1$ may be for example hydrogen or a group of the formula (II) or (III); $R_2$ may be for example hydrogen, a group of the formula (II) or (III), $C_1$–$C_{18}$alkyl, $C_5$–$C_{12}$cycloalkyl unsubstituted or substituted by 1, 2 or 3 $C_1$–$C_4$alkyl or $C_1$–$C_4$alkoxy; phenyl unsubstituted or substituted by 1, 2 or 3 $C_1$–$C_4$alkyl or $C_1$–$C_4$alkoxy; $C_7$–$C_9$phenylalkyl unsubstituted or substituted on the phenyl by 1, 2 or 3 $C_1$–$C_4$alkyl or $C_1$–$C_4$alkoxy; and $A_2$ may be for example hydrogen, a group of the formula (II) or (III), $C_1$–$C_{12}$alkyl, $C_5$–$C_{12}$cycloalkyl unsubstituted or substituted by 1, 2 or 3 $C_1$–$C_4$alkyl or $C_1$–$C_4$alkoxy.

$R_5$, $R_9$, $R_{10}$ and $R_{12}$ independently of one another are preferably hydrogen, $C_1$–$C_4$alkyl, —OH, $C_6$–$C_{12}$alkoxy, $C_5$–$C_8$cycloalkoxy, allyl, benzyl or acetyl, in particular hydrogen or $C_1$–$C_4$alkyl such as methyl.

$R_1$ and $R_2$ independently of one another are preferably $C_1$–$C_{16}$alkyl or phenyl. A preferred meaning of $R_2$ is also hydrogen.

The variables m and n are preferably zero.

Preferred compounds of the formula (I) are those wherein m and n are zero and $R_1$ is hydrogen or a group of the formula (II).

$X_3$ is preferably a direct bond.

Preferred compounds of the formula (I) are also those wherein $R_2$ is hydrogen, $C_1$–$C_{16}$alkyl, $C_5$–$C_8$cycloalkyl unsubstituted or substituted by methyl; phenyl or benzyl;

$X_1$ and $X_2$ independently of one another are $C_2$–$C_8$alkylene;

$A_1$ is a group of the formula (II) or (III) wherein $R_3$ is $C_2$–$C_{10}$alkylene, and $R_4$, $R_6$, $R_7$ and $R_8$ independently of one another are —O— or >N—$R_{11}$ with the radicals $R_{11}$ independently of one another being hydrogen, $C_1$–$C_6$alkyl or a group of the formula (IV); and $A_2$ is hydrogen, a group of the formula (II), $C_1$–$C_8$alkyl or $C_5$–$C_8$cycloalkyl.

Preferred compounds of the formula (I) are further those wherein m and n are zero;

$R_1$ is hydrogen or a group of the formula (II);

$R_2$ is hydrogen;

$A_1$ is a group of the formula (II) or (III);
$A_2$ is a group of the formula (II);
$R_3$ is $C_2$–$C_{10}$alkylene,
$R_4$, $R_6$, $R_7$ and $R_8$ independently of one another are —O— or >N—$R_{11}$ with the radicals $R_{11}$ independently of one another being hydrogen, $C_1$–$C_4$alkyl or a group of the formula (IV),
$X_3$ is a direct bond, and
$X_4$ is $C_2$–$C_{10}$alkylene.

Preferred compounds of the formula (I) are those wherein
$R_1$ and $R_2$ independently of one another are $C_1$–$C_{16}$alkyl, $C_5$–$C_8$cycloalkyl unsubstituted or substituted by methyl; phenyl or benzyl;
$X_1$ and $X_2$ independently of one another are $C_2$–$C_8$alkylene;
$A_1$ is a group of the formula (II) or (III) wherein
$R_3$ is $C_2$–$C_{10}$alkylene, and
$R_4$, $R_6$, $R_7$ and $R_8$ independently of one another are —O— or >N—$R_{11}$ with $R_{11}$ being hydrogen, $C_1$–$C_6$alkyl or a group of the formula (IV); and
$A_2$ is hydrogen, $C_1$–$C_8$alkyl or $C_5$–$C_8$cycloalkyl.

Preferred compounds of the formula (I) are further those wherein
$R_1$ and $R_2$ independently of one another are $C_1$–$C_{12}$alkyl or phenyl;
$A_1$ is a group of the formula (II) or (III) wherein
$R_3$ is $C_2$–$C_{10}$alkylene,
$R_4$, $R_6$, $R_7$ and $R_8$ independently of one another are —O— or >N—$R_{11}$ with $R_{11}$ being hydrogen or $C_1$–$C_4$alkyl, and
$X_4$ is $C_2$–$C_{10}$alkylene; and
$A_2$ is hydrogen.

A preferred embodiment of this invention relates to compounds of the formula (I) wherein m and n are zero;
$R_1$ is hydrogen, $C_1$–$C_{12}$alkyl, phenyl or a group of the formula (II);
$R_2$ is hydrogen, $C_1$–$C_{12}$alkyl or phenyl;
$A_1$ is a group of the formula (II) or (III);
$A_2$ is hydrogen or a group of the formula (II);
$R_3$ is $C_2$–$C_{10}$alkylene,
$R_4$, $R_6$, $R_7$ and $R_8$ independently of one another are —O— or >N—$R_{11}$ with the radicals $R_{11}$ independently of one another being hydrogen, $C_1$–$C_4$alkyl or a group of the formula (IV), and
$X_4$ is $C_2$–$C_{10}$alkylene.

The definition of the terminal groups which saturate the free valences in the compounds of the formula (I) depends on the processes used for their preparation. The terminal groups can also be modified after the preparation of the compounds.

The terminal groups have for example one of the meanings given above for $R_1$ and $R_2$ or are a group —O—Si(E)$_3$ or a group —Si(E)$_3$ with the radicals E independently of one another being $C_1$–$C_8$alkyl or phenyl. Hydrogen is a particularly preferred end group.

When the sum p+q is a number from 3 to 10, the free valences in the formula (I) can also form together a direct bond.

The compounds of this invention, in particular the compounds of the formula (I), can be prepared in analogy to known processes. Some examples of the preparation are shown below.

A polysilane compound of the formula (I)

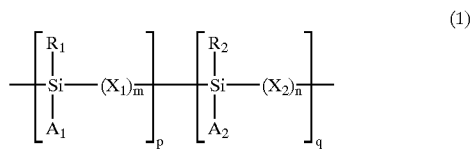

wherein $R_1$, $R_2$, $X_1$, $X_2$, $A_1$, $A_2$, m, n, p and q are as defined above with the proviso that $R_1$, $R_2$, $A_1$ and $A_2$ are different from a group of the formula (II) or (III) and at least one of $R_1$, $R_2$, $A_1$ and $A_2$ is hydrogen, can be reacted, for example, with the appropriate quantity of an alkene derivative capable of forming a group of the formula (II) or (III). Some of such alkene derivatives are described in U.S. Pat. Nos. 5,134,233 and 5,219,905 which are incorporated by reference herein.

This hydrosilylation reaction (Hsiao; J.A.C.S. 116, 9779 (1994) and Chatgilialoglu; Acc. Chem. Res. 25, 188 (1992)) is a free radical substitution which is conveniently carried out in the presence of a catalytic amount of a radical initiator, for example an azonitrile such as 2,2'-azo-bisisobutyronitrile, or an alkyl peroxide, such as di-t-butyl peroxide or amyl peroxide, an acyl peroxide such as benzoyl peroxide, or an alkyl hydroperoxide such as t-butyl hydroperoxide. 2,2'-azo-bisisobutyronitrile and di-t-butyl peroxide are preferred.

The reaction can be carried out in an inert organic solvent such as toluene, xylene, benzene, trimethylbenzene, t-butylbenzene, 2,5-dimethyltetrahydrofurane, dioxane, octane, decane, dodecane or cyclohexane. The reaction may also be carried out in neat. Toluene, xylene, trimethylbenzene or cyclohexane is preferred. The reaction temperature is for example 60–220° C., in particular 60–140° C.

When $R_1$, $R_2$, $A_1$ and/or $A_2$ are for example a group of the formula (2)

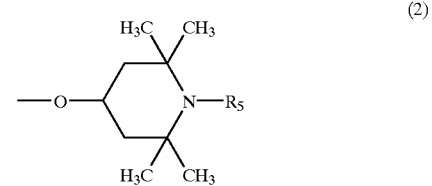

wherein $R_5$ is as defined above, the compounds of the formula (I) can also be prepared by reacting a compound of the formula (1) wherein the corresponding radicals $R_1$, $R_2$, $A_1$ and/or $A_2$ are hydrogen with the appropriate quantity of a compound of the formula (3), under the above described conditions.

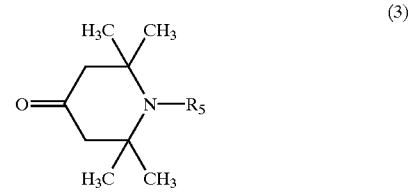

The compounds of the formula (3) can be prepared according to known methods and are commercially available.

The polysilane compounds of the formula (1) can be prepared in analogy to the method described in EP-A-836, 635 which corresponds to U.S. patent application Ser. No. 08/981,433 which is incorporated by reference herein.

When m, n and q are zero, the compounds of the formula (I) can also be prepared, according to Scheme (a) by reacting an alkene derivative capable of forming the group $A_1$ with an appropriate silane compound.

Scheme (a):

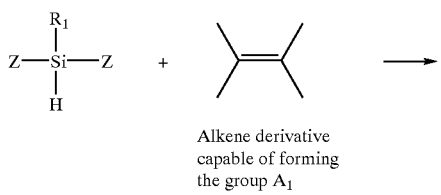

Alkene derivative capable of forming the group $A_1$

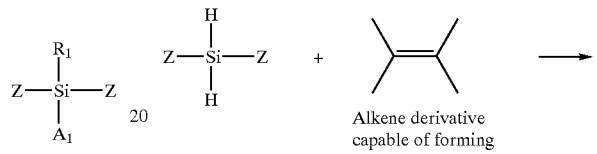

Z is for example Cl or —O—$Z_1$ or —N($Z_1$)$_2$ with $Z_1$ being e.g. $C_1$-$C_{10}$ alkyl;

This hydrosilylation reaction (J. L. Speier, J. A. Webster and G. H. Barnes; J.A.C.S. 79, 974 (1957)) is preferably carried out in the presence of a catalytic amount of Pd, Pt or Rh or their complexes, in particular $H_2PtCl_6$ or $PtCl_2$ (phenyl-CH=$CH_2$)$_2$ in an inert organic solvent, such as tetrahydrofurane, dioxane, hexane, heptane, cyclohexane, toluene or xylene, at a temperature of 60–150° C., e.g. 80–130° C.

When Z is Cl, the formation of the polysilane can be carried out, for example, by Wurtz's coupling (oligomerization) of the suitable substituted dichlorosilanes and monochlorosilanes with Na or Mg as reactants as described in JP 91-45479 (Chem. Abstr. 118: 103000 and Derwent 92-361941/44) and J. Chem. Rev. 89, 1359–1410, 1989. The reaction may be carried out with molten Na or by using organomagnesium compounds (Grignard reaction) in a hydrocarbon solvent or toluene.

A compound according to this invention with the desired end groups can be obtained e.g. by reacting the polysilane dichloro intermediate with an appropriate monochloro chain terminator.

The silane derivative obtained according to Scheme (a) can also be reduced to an organosilicon hydride as reported in Scheme (b) below.

Scheme (b):

Scheme (b):

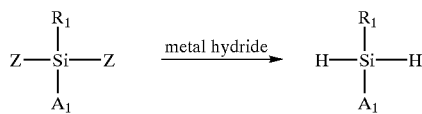

The metal hydride is for example $LiAlH_4$, $NaAlH_4$, $NaBH_4$, NaH, LiH and the like. The reaction is conveniently carried out in an anhydrous solvent such as diethyl ether, tetrahydrofurane, dyglime (bis(2-methoxyethyl)ether) or dioxane at a temperature of –10–160° C., preferably 0° C. to room temperature.

If desired, an intermediate of the formula (4)

(4)

wherein $R_1$ and $A_1$ are a group of the formula (II) or (III) can be prepared according to Schemes (a-1) and (b-1) in analogy to the method described above.

Scheme (a-1):

Scheme (a-1):

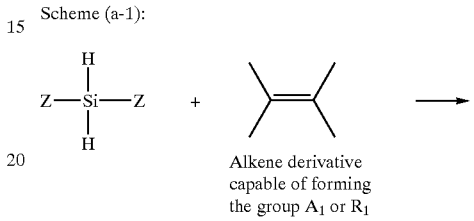

Alkene derivative capable of forming the group $A_1$ or $R_1$

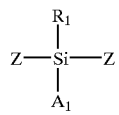

Z is for example Cl or a group —O—Z, or —N($Z_1$)$_2$ with $Z_1$ being e.g. $C_1$-$C_{10}$alkyl.

Scheme (b-1):

Scheme (b-1):

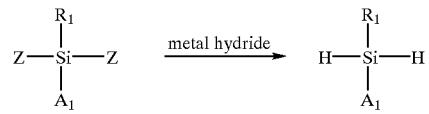

The formation of the corresponding polysilane of the formula (I) can subsequently be carried out by a dehydrogenative coupling reaction (oligomerization) starting from the suitable hydrosilane intermediate in the presence of catalytic amounts of organo-transition metal complexes, in particular in the presence of h$^5$-cyclopentadienyl complexes of Ti, Zr, V, U, Hf, Nd, Y and Sc as reported, for example, in U.S. Pat. Nos. 4,965,386, 5,087,719, J.A.C.S. 111, 8043–44 (1989), J.A.C.S. 108, 4059–66 (1986), and Acc. Chem. Res. 26, 22–29 (1993). The complexes of Zr and Ti are preferred, in particular the following complexes:

$Cp_2ZrX_2$, $Cp_2ZrXCl$, $Cp_2Zr[CH_2Si(CH_3)_3]_2$,
$Cp_2TiX_2$, $Cp_2TiXCl$, $Cp_2Zr[Si(Si(CH_3)_3)_3]CH_3$,
$CpCp^*Zr H_2$,
$CpCp^*Zr[Si(Si(CH_3)_3)_3]CH_3$,
$CpCp^*Zr[Si(Si(CH_3)_3)_3]Cl$
with Cp=$\eta^5$-cyclopentadienyl, Cp*=$\eta^5$-pentamethylcyclopentadienyl and X=$C_1$-$C_8$alkyl. Pt(0) or Pd(0) or their complexes, in particular Pt(cod)$_2$ or $(H_3C)_2$Pt (cod) with cod being cyclooctadienyl can also be used.

The reaction can be carried out without a solvent or in an inert solvent, for example benzene, toluene, ethylbenzene, xylene or tetrahydrofurane. Toluene and ethylbenzene are preferred solvents. The reaction temperature is for example –20–140° C., preferably –10–80° C., in particular –10–30° C.

The compounds of this invention are very effective in improving the light, heat and oxidation resistance of organic materials, especially synthetic polymers and copolymers, in particular polypropylene multifilaments and fibres.

Examples of organic materials which can be stabilized are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated.

These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activator s may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE(EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/ alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.

The invention thus also relates to a composition comprising an organic material susceptible to degradation induced by light, heat or oxidation and at least one compound of this invention.

The organic material is preferably a synthetic polymer, more particularly one selected from the aforementioned groups. Polyolefins are preferred and polyethylene and polypropylene are particularly preferred.

A further embodiment of this invention is a method for stabilizing an organic material against degradation induced by light, heat or oxidation, which comprises incorporating into said organic material at least one compound of this invention.

The compounds of this invention can be used in various proportions depending on the nature of the material to be stabilized, on the end use and on the presence of other additives.

In general, it is appropriate to use, for example, 0.01 to 5% by weight of the compounds of this invention, relative to the weight of the material to be stabilized, preferably 0.05 to 2%, in particular 0.05 to 1%.

The compounds of this invention can be added, for example, to the polymeric materials before, during or after the polymerization or crosslinking of the said materials. Furthermore, they can be incorporated in the polymeric materials in the pure form or encapsulated in waxes, oils or polymers.

In general, the compounds of this invention can be incorporated in the polymeric materials by various processes, such as dry mixing in the form of powder, or wet mixing in the form of solutions or suspensions or also in the form of a masterbatch which contains the compounds of this invention in a concentration of 2.5 to 25% by weight; in such operations, the polymer can be used in the form of powder, granules, solutions, suspensions or in the form of latices.

The materials stabilized with the compounds of this invention can be used for the production of mouldings, films, tapes, monofilaments, fibres, surface coatings and the like.

If desired, other conventional additives for synthetic polymers, such as antioxidants, UV absorbers, nickel stabilizers, pigments, fillers, plasticizers, corrosion inhibitors and metal deactivators, can be added to the organic materials containing the compounds of this invention.

Particular examples of said conventional additives are:

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1-yl) phenol, 2,4-dimethyl-6-(1'-methylheptadec-1'-yl)phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5di-tert-butyl4-hydroxyphenyl)adipate.
1.4. Tocopherols, for example α-tocopherol, β-tocopherol, γ-tocopherol, δ-tocopherol and mixtures thereof (Vitamin E).
1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.
1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.
1.7. O-. N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.
1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
1.12. Acylaminophenols, for example 4-hydroxylauranilide, 4-hydroxystearanilide, octyl N-(3,5-di-tert-butyl-4-hydroxyphenyl)carbamate.
1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.
1.14. Esters of β-(5tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl] oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)-propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1, 4diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5chloro-benzotriazole, 2-(3'-tert-butyl-2'-hydroxy-5'-(2-methoxycarbonylethyl) phenyl)benzotriazole, 2-( 3'-tert-butyl-2'-hydroxy-5'-( 2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$–]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy) phenyl]-1,3,5-triazine, 2-(2-hydroxyphenyl)-4-(4-methoxyphenyl)-6phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis (salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3', 5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-ti-tert-butylphenoxy)-1,3,2-dioxaphosphirane.

Especially preferred are the following phosphites:
Tris(2,4di-tert-butylphenyl)phosphite (Irgafos® 168, Ciba-Geigy), tris(nonylphenyl)phosphite,

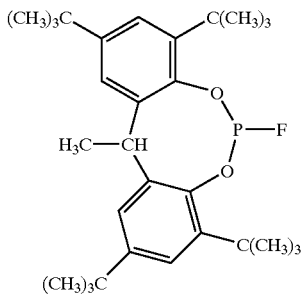

(A)

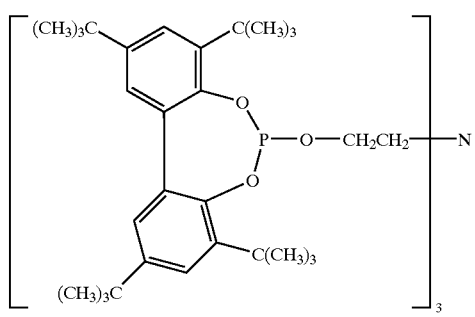

(B)

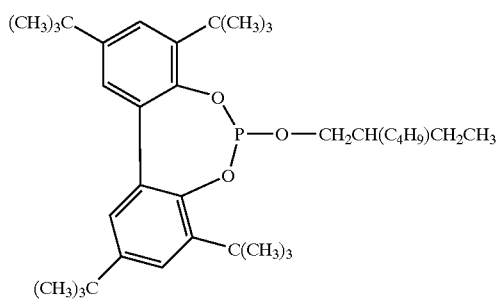

(C)

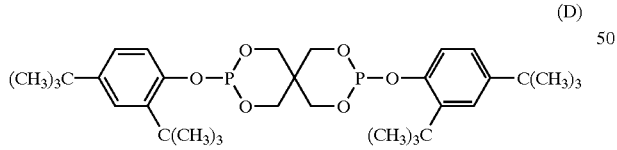

(D)

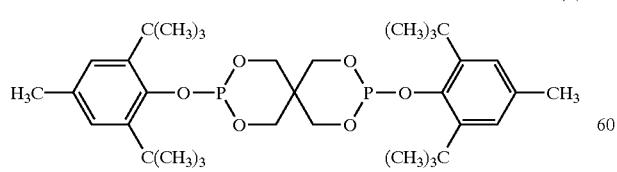

(E)

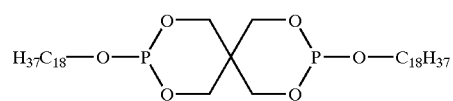

(F)

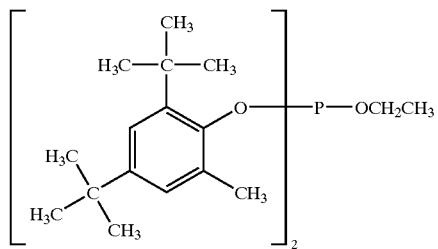

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Especially preferred are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl4-pivaloyloxyphenyl)-5,7-di-tert-butylbenzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The weight ratio of the compounds of this invention to the conventional additives may be for example 1:0.5 to 1:5.

The compounds of the present invention can also be used as stabilizers, especially as light stabilizers, for almost all materials known in the art of photographic reproduction and other reproduction techniques as e.g. described in Research Disclosure 1990, 31429 (pages 474 to 480).

The invention is illustrated in more detail by the following Examples. All percentages or parts are by weight, unless otherwise indicated. The compounds of the following Examples I-3, I-4, I-6, I-11 and I-12 as well as II-1C, II-2C, II-3, II-4 and II-5C are of particular In the following examples, the number average molecular weight $\overline{Mn}$ is determined by GPC (Gel Permeation Chromatography). The GPC measurements are carried out on a ®Perkin Elmer LC 250 liquid chromatograph equipped with a refractive index ®Perkin Elmer LC 30 and $\overline{Mn}$ is calculated by using a ®Perkin Elmer software Nelson 900. All GPC measurements are carried out using air free chromatographic grade tetrahydrofuran (THF) as solvent at 45° C. Polystyrene standards are used for the calibration curve and are supplied by Polymer Laboratories (Shropshire, U.K.). The used columns are PLGEL (Polymer Laboratories-Shropshire U.K.) 300 mm×7.5 mm Stationary phase 3µMixed E supplied by Polymer Laboratories.

The NMR spectra are recorded at 300 MHz and 22° C. in $CDCl_3$.

EXAMPLE I-1

Preparation of a Polysilane Compound of the Formula

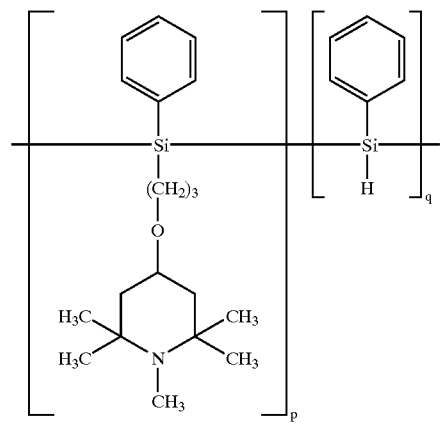

with a p:q molar ratio of 1:2.

42 g (20 mmoles) of 4-allyloxy-1,2,2,6,6-pentamethylpiperidine and 7.0 g (6.0 mmoles) of dihydro-terminated polyhydrophenylsilane ($\overline{Mn}$=1210 g/mole by GPC) are dissolved in 110 ml of cyclohexane. The solution is cooled down to −20° C. and purged with $N_2$. 0.16 g (1 mmole) of 2,2-azobisisobutyronitrile are added and the mixture is heated to 80° C. The reaction mixture is maintained at 80° C. for 3 hours. Subsequently, the mixture is cooled down to room temperature and concentrated under vacuum (40° C./1 mbar). The residue is taken up with 30 ml of acetonitrile and filtered. The solid obtained is washed with 20 ml of diethyl ether and dried under vacuum (30° C./1 mbar). A white product is obtained.

Melting point: 80–84° C.

$\overline{Mn}$=1970 g/mole by GPC

The NMR and IR analyses confirm the above structure.

The individual recurring units can have a random, alternate or block distribution.

EXAMPLE I-2

Preparation of a Polysilane Compound of the Formula

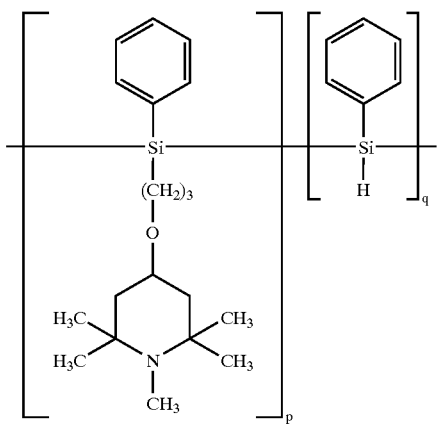

with a p:q molar ratio of 2:1.

In analogy to the method described in Example I-1, 6.6 g (31.3 mmoles) of 4-allyloxy-1,2,2,6,6-pentamethylpiperidine are reacted with 5.5 g (4.7 mmoles) of dihydroterminated polyhydrophenylsilane ($\overline{Mn}$=1210 g/mole by GPC) in 110 ml of cyclohexane and in the presence of 1.0 g (6.2 mmoles) of 2,2'-azobisisobutyronitrile. A light yellow product is obtained.

Melting point 79–81° C.

$\overline{Mn}$=2340 g/mole by GPC

The NMR and IR analyses confirm the above structure.

The individual recurring units can have a random, alternate or block distribution.

EXAMPLE I-3

Preparation of a Polysilane Compound of the Formula

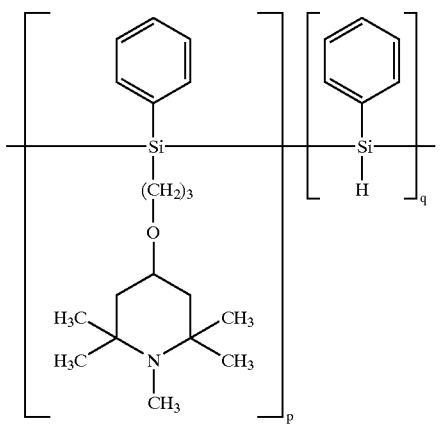

with a p:q molar ratio of 9:1.

In analogy to the method described in Example I-1, 6.3 g (29.8 mmoles) of 4-allyloxy-1,2,2,6,6-pentamethylpiperidine are reacted with 3.8 g (3.2 mmoles) of dihydroterminated polyhydrophenylsilane ($\overline{Mn}$=1210 g/mole by GPC) in 100 ml of xylene and in the presence of 1.2 g (6.4 mmoles) of 2,2'-azobisisobutyronitrile. A white product is obtained.

Melting point: 61–63° C.

$\overline{Mn}$=2590 g/mole by GPC

The NMR and IR analyses confirm the above structure.

The individual recurring units can have a random, alternate or block distribution.

EXAMPLE I-4

Preparation of a Polysilane Compound of the Formula

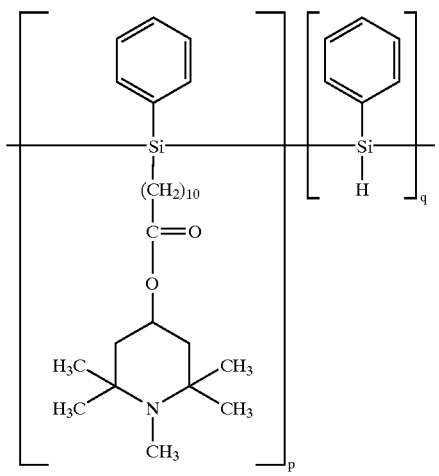

with a p:q molar ratio of 2:1.

In analogy to the method described in Example I-1, 7.9 g (23.4 mmoles) of undec-10-enoic acid-1,2,2,6,6-pentamethyl-4-piperidyl ester are reacted with 4.1 g (3.5 mmoles) of dihydroterminated polyhydrophenylsilane ($\overline{Mn}$=1210 g/mole by GPC) in 120 ml of cyclohexane and in the presence of 0.7 g (4.2 mmoles) of 2,2'-azobisisobutyronitrile. A white wax is obtained.

Melting point: <30° C.

$\overline{Mn}$=3300 g/mole by GPC

Molar Extinction Coefficient Measured in THF (tetrahydrofuran)

$\epsilon$=23 771 at 300 nm, $\epsilon$=20 428 at 310 nm, and $\epsilon$=16 514 at 320 nm.

The individual recurring units can have a random, alternate or block distribution.

EXAMPLE I-5

Preparation of a Polysilane Compound of the Formula

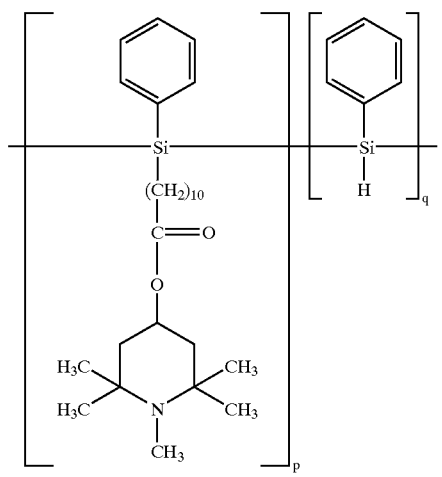

with a p:q molar ratio of 1:2.

In analogy to the method described in Example I-1, 5.8 g (17.1 mmoles) of undec-10-enoic acid 1,2,2,6,6-pentamethyl-4-piperidyl ester are reacted with 6.1 g (5.2 mmoles) of dihydroterminated polyhydrophenylsilane ($\overline{Mn}$=1210 g/mole by GPC) in 110 ml of cyclohexane and in the presence of 0.85 g (5.1 mmoles) of 2,2'-azobisisobutyronitrile. A yellow wax is obtained.

Melting point: <30° C.

$\overline{Mn}$=2200 g/mole by GPC

Molar Extinction Coefficient Measured in THF

ε=31 872 at 300 nm,

ε=27 385 at 310 nm, and

ε=19 102 at 320 nm.

The individual recurring units can have a random, alternate or block distribution.

EXAMPLE I-6

Preparation of a Polysilane Compound of the Formula

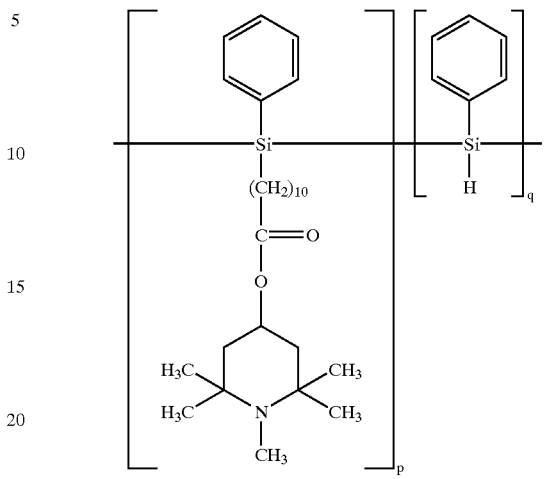

with a p:q molar ratio of 9:1.

In analogy to the method described in Example I-1, 10.5 g (31.1 mmoles) of undec-10-enoic acid 1,2,2,6,6-pentamethyl-4-piperidyl ester are reacted with 4.0 g (3.4 mmoles) of dihydroterminated polyhydrophenylsilane ($\overline{Mn}$=1210 g/mole by GPC) in 120 ml of xylene and in the presence of 0.9 g (5.1 mmoles) of di-t-butyl peroxide. A yellow wax is obtained.

Melting point: <30° C.

$\overline{Mn}$=3810 g/mole by GPC

Molar Extinction Coefficient Measured in THF

ε=13 417 at 300 nm,

ε=11 306 at 310 nm, and

ε=9 472 at 320 nm.

The individual recurring units can have a random, alternate or block distribution.

EXAMPLE I-7

A) Preparation of the Intermediate of the Formula

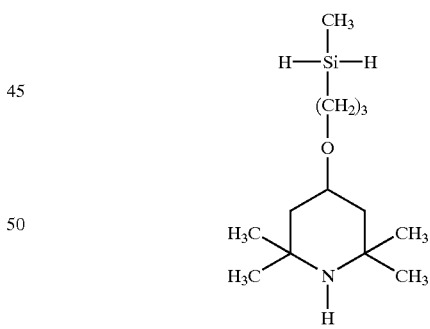

44 g (0.132 mol) of 4[3-(diethoxy-methyl-silanyl)propoxy]-2,2,6,6-tetramethylpiperidine (described in Example 2 of U.S. Pat. No. 4,977,259 which is incorporated by reference herein), are added dropwise at 0° C. to a suspension of 3.8 g (0.1 mol) of LiAlH$_4$ in 450 ml of ethyl ether during 0.5 hours. Subsequently, the mixture is maintained at room temperature for 4 hours. Then, the solvent is removed under vacuum and 300 ml of n-hexane are added and the mixture is stirred for 1 hour. The suspension obtained is filtered off, the solvent is removed in vacuum and the residual oil is distilled under vacuum (boiling point: 98–100° C. at 1 mbar). 23 g of a colorless oil (assay by GC 97%) are obtained. The NMR and FT-IR analyses confirm the above structure.

B) Preparation of a Polysilane Compound of the Formula

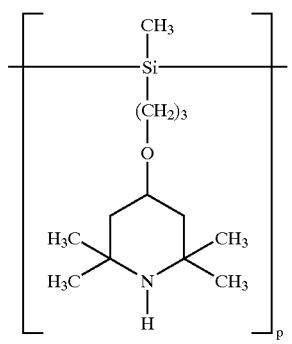

55 ml of toluene and 0.82 g (2.83 mmol) of bis(cyclopentadienyl)zirconium dichloride are cooled between −10° C. and 0C. Subsequently, 2.6 ml (5.66 mmol) of BuLi in a n-hexane solution (2.5 M) are added and the mixture is stirred for 0.5 hours. Then, 23 g (94.6 mmol) of the compound of I-7A) are added dropwise during 0.5 hours at 0° C. The reaction mixture is allowed to cool to room temperature and is then heated to 100° C. for 6 days. The solution is diluted with 100 ml of toluene and treated with 5 g of ®Tonsyl under stirring for 1 hour. After filtration, solvent and unreacted starting material are removed under vacuum, obtaining 7.3 g of a pale yellow oil ($\overline{Mn}$=975 g/mole by GPC).

NMR: 0.04 ppm (s, 3 H); 0.11 ppm (m, 2 H); 0.85 ppm (t, 2 H); 1.05 ppm (t, 12 H); 1.92 ppm (m, 2 H); 3.38 ppm (t, 2 H); 3.58 ppm (m, 1 H).

EXAMPLE I-8

Preparation of a Polysilane Compound of the Formula 8.3 g (14.3 mmoles) of 6-allyloxy-N,N'-dibutyl-N,N'-bis(1,2,2,6,6-pentamethyl-4-piperidyl)-[1,3,5]-triazine-2,4-diamine and 5.3 g (4.5 mmoles) of dihydroterminated polyhydrophenylsilane ($\overline{Mn}$=1210 g/mole by GPC) are dissolved in 120 ml of toluene. The mixture is cooled down to −20° C. and purged with $N_2$. Then, 0.12 g (0.7 mmoles) of 2,2'-azobisisobutyronitrile are added and the mixture is heated to 80° C. The reaction is maintained at 80° C. for 3 hours, then cooled down to 0° C. and further 0.24 g (1.4 mmoles) of 2,2'-azobisisobutyronitrile are added. The mixture is heated again to 80° C. for further 4 hours. Subsequently, the mixture is evaporated under vacuum (40° C./1 mbar). The residue is taken up with 60 ml of acetonitrile and filtered. The solid so obtained is dried in an oven under vacuum (40° C./1 mbar). A white product is obtained.

Melting point: 110° C.

$\overline{Mn}$=2830 g/mole by GPC

The NMR and IR analyses confirm the above structure.

The individual recurring units can have a random, alternate or block distribution.

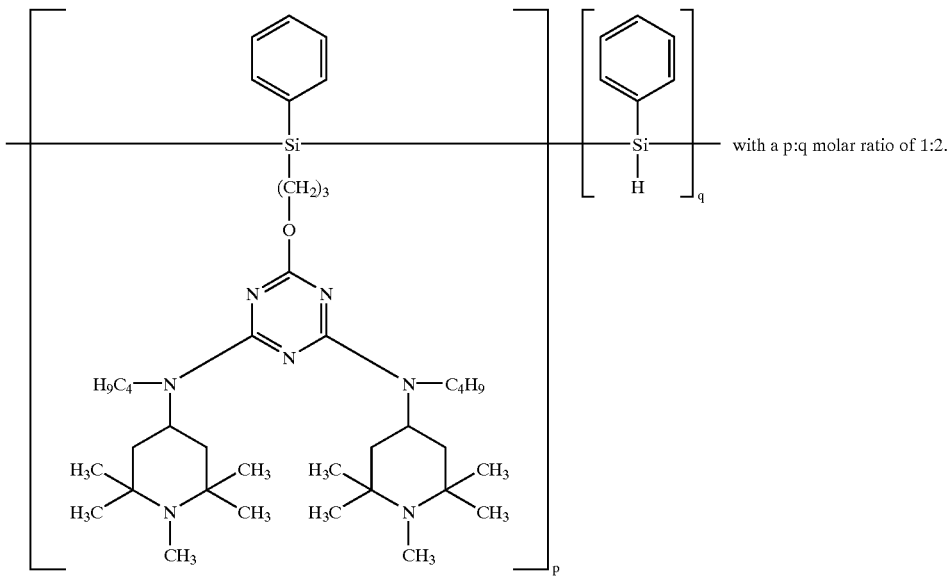

EXAMPLE I-9

Preparation of a Polysilane Compound of the Formula

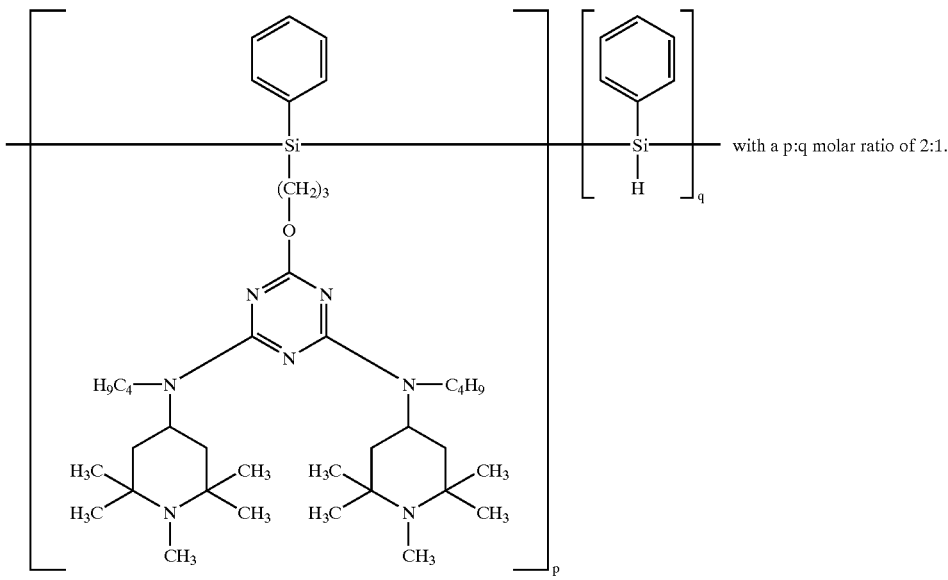

with a p:q molar ratio of 2:1.

In analogy to the method described in Example I-8, 11.6 g (20.0 mmoles) of 6-allyloxy-N,N'-dibutyl-N,N'-bis(1,2,2,6,6-pentamethyl-4-piperidyl)-[1,3,5]-triazine-2,4-diamine are reacted with 3.7 g (3.15 mmoles) of dihydroterminated polyhydrophenylsilane ($\overline{Mn}$=1210 g/mole by GPC) in 130 ml of toluene and in the presence of 0.64 g (4 mmoles) of 2,2'-azobisisobutyronitrile. A white product is obtained.

Melting point: 130–135° C.
$\overline{Mn}$=3200 g/ mole by GPC

The NMR and IR analyses confirm the above structure.

The individual recurring units can have a random, alternate or block distribution.

EXAMPLE I-10

Preparation of a Polysilane Compound of the Formula

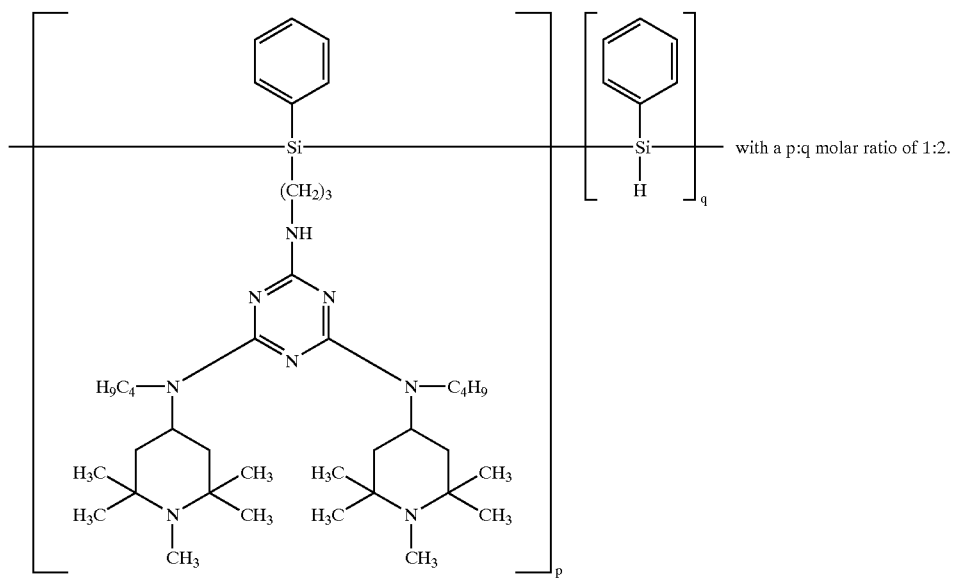

with a p:q molar ratio of 1:2.

In analogy to the method described in Example I-8, 8.3 g (14.2 mmoles) of 6-allylamino-N,N'-dibutyl-N,N'-bis(1,2,2,6,6-pentamethyl-4-piperidyl)-[1,3,5]-triazine-2,4-diamine are reacted with 5.2 g (4.4 mmoles) of dihydroterminated polyhydrophenylsilane ($\overline{Mn}$=1210 g/mole by GPC) in 120 ml of toluene and in the presence of 0.2 g (1.4 mmoles) of 2,2'-azobisisobutyronitrile. A white product is obtained.

Melting point: 134–138° C.
$\overline{Mn}$2605 g/mole by GPC

The NMR and IR analyses confirm the above structure.

The individual recurring units can have a random, alternate or block distribution.

EXAMPLE I-11

Preparation of a Polysilane Compound of the Formula

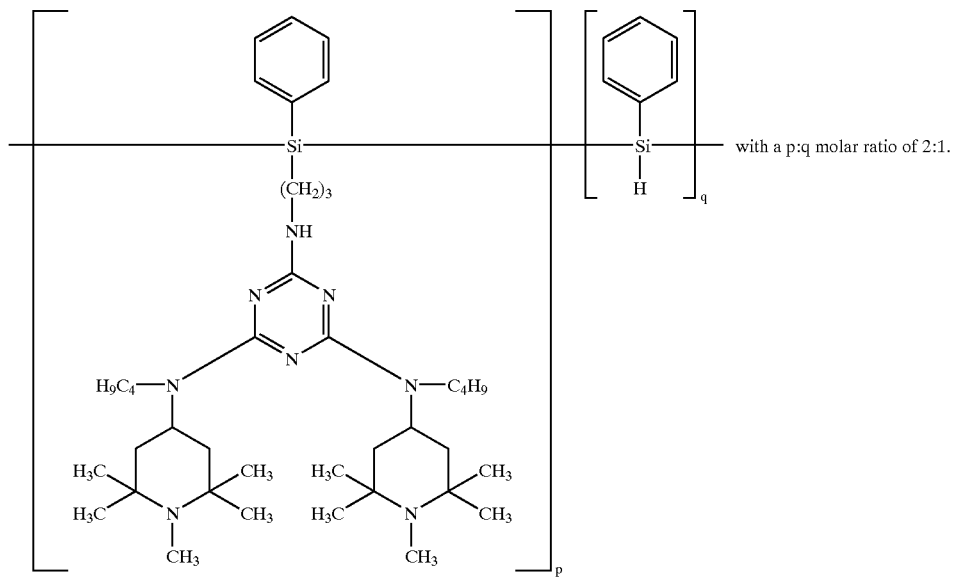

with a p:q molar ratio of 2:1.

In analogy to the method described in Example I-8, 11.6 g (20.0 mmoles) of 6-allylamino-N,N'-dibutyl-N,N'-bis(1,2,2,6,6-pentamethyl-4-piperidyl)-[1,3,5]-triazine-2,4-diamine are reacted with 3.7 g (3.15 mmoles) of dihydroterminated polyhydrophenylsilane ($\overline{Mn}$=1210 g/mole by GPC) in 130 ml of xylene and in the presence of 0.3 g (2 mmoles) of di-t-butyl peroxide. A white product is obtained.

Melting point: 153–158° C.

$\overline{Mn}$=3480 g/mole by GPC

The NMR and IR analyses confirm the above structure.

The individual recurring units can have a random, alternate or block distribution.

EXAMPLE I-12

Preparation of a Polysilane Compound of the Formula

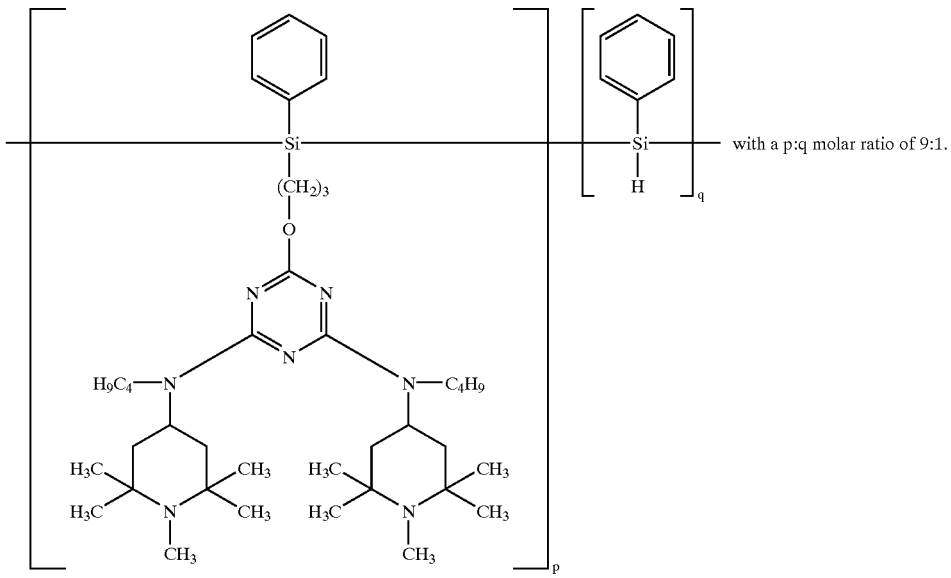

In analogy to the method described in Example I-8, 12.5 g (21.4 mmoles) of 6-allyloxy-N,N'-dibutyl-N,N'-bis(1,2,2,6,6-pentamethyl-4-piperidyl)-[1,3,5]-triazine-2,4-diamine are reacted with 2.7 g (2.3 mmoles) of dihydroterminated polyhydrophenylsilane ($\overline{Mn}$=1210 g/mole by GPC) in 140 ml of xylene and in the presence of 0.31 g (2.1 mmoles) of di-t-butyl peroxide. A white product is obtained.

Melting point: 110 –115° C.
$\overline{Mn}$=3500 g/mole by GPC

The NMR and IR analyses confirm the above structure.

The individual recurring units can have a random, alternate or block distribution.

EXAMPLE I-13

Preparation of a Polysilane Compound of the Formula

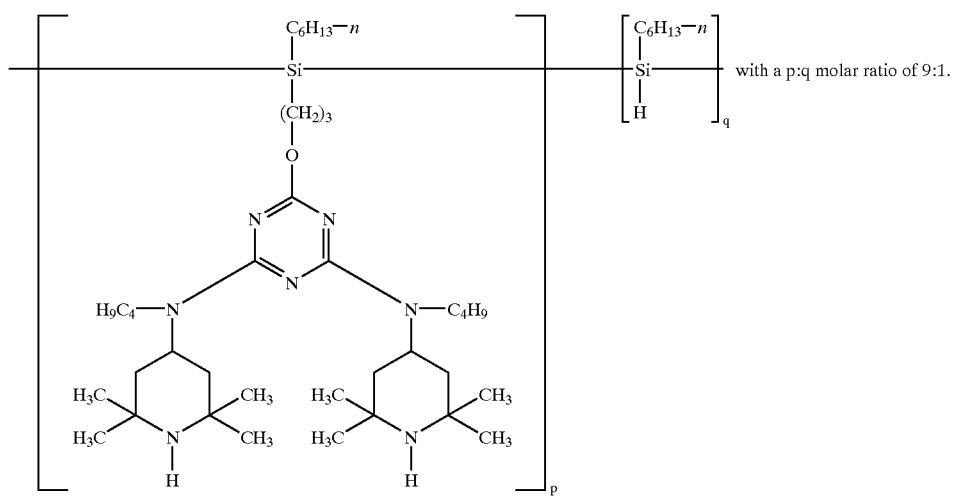

In analogy to the method described in Example I-8, 17.5 g (31.4 mmoles) of 6-allyloxy-N,N'-dibutyl-N,N'-bis(2,2,6,6-tetramethyl-4-piperidyl)-[1,3,5]-triazine-2,4-diamine are reacted with 4 g (3.2 mmoles) of dihydroterminated polyhydro-n-hexylsilane ($\overline{Mn}$=1230 g/mole by GPC) in 200 ml of xylene and in the presence of 0.69 9 (4.8 mmoles) of di-t-butyl peroxide. A white product is obtained.

Melting point: 79–84° C.

$\overline{Mn}$=3410 g/mole by GPC

The NMR and IR analyses confirm the above structure.

The individual recurring units can have a random, alternate or block distribution.

EXAMPLE I-14

Preparation of a Polysilane Compound of the Formula

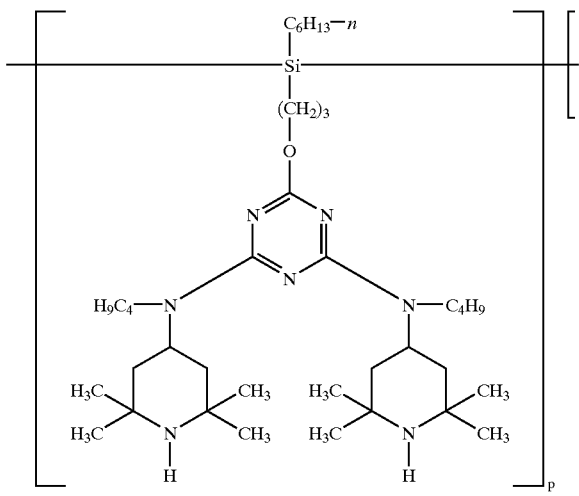

with a p:q molar ratio of 1:1.5.

In analogy to the method described in Example I-8, 11.7 g (20.9 mmoles) of 6-allyloxy-N,N'-dibutyl-N,N'-bis(2,2,6, 6-tetramethyl-4-piperidyl)-[1,3,5]-triazine-2,4-diamine are reacted with 6.0 g (4.8 mmoles) of dihydroterminated polyhydro-n-hexylsilane ($\overline{Mn}$=1230 g/mole by GPC) in 170 ml of xylene and in the presence of 0.31 g (2.1 mmoles) of di-t-butyl peroxide. A yellowish resin is obtained.

$\overline{Mn}$=3250 g/mole by GPC

FT-IR: Si—H peak at 2077 $cm^{-1}$.

NMR: 0.8–1.8 ppm (m, 78H); 3.28 ppm (m, 4H); 4.21 ppm (m, 2H); 5.18 ppm (m, 1H).

The individual recurring units can have a random, alternate or block distribution.

EXAMPLE I-15

Preparation of a Polysilane Compound of the Formula

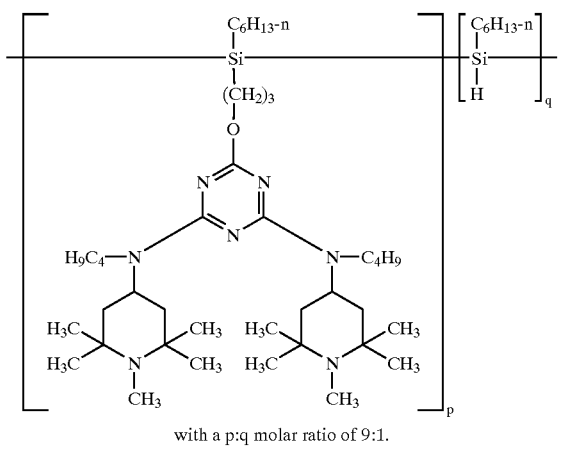

with a p:q molar ratio of 9:1.

In analogy to the method described in Example I-8, 9.1 g (15.5 mmoles) of 6-allyloxy-N,N'-dibutyl-N,N'-bis(1,2,2,6,6-pentamethyl-4-piperidyl)-[1,3,5]-triazine-2,4-diamine are reacted with 2.1 g (1.7 mmoles) of dihydroterminated polyhydro-n-hexylsilane ($\overline{Mn}$=1230 g/mole by GPC) in 100 ml of xylene and in the presence of 0.7 g (4.8 mmoles) of di-t-butyl peroxide. A white product is obtained.

Melting point: 75–79° C.

$\overline{Mn}$=3500 g/mole by GPC

The NMR and IR analyses confirm the above structure.

The individual recurring units can have a random, alternate or block distribution.

EXAMPLE I-16

Preparation of a Polysilane Compound of the Formula

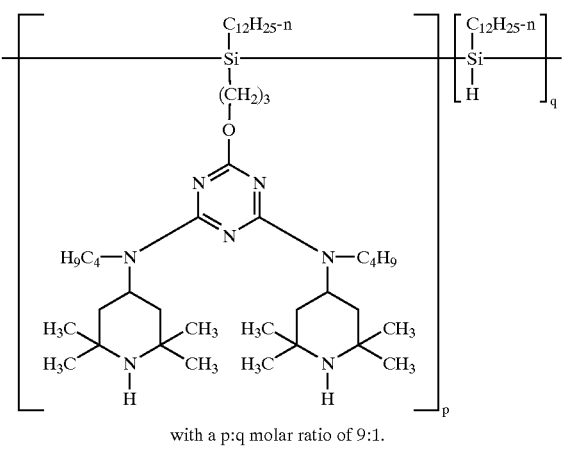

with a p:q molar ratio of 9:1.

In analogy to the method described in Example I-8, 11.4 g (20.4 mmoles) of 6-allyloxy-N,N'-dibutyl-N,N'-bis(2,2,6,6-tetramethyl-4-piperidyl)-[1,3,5]-triazine-2,4-diamine are reacted with 4.8 g (2.2 mmoles) of dihydroterminated polyhydro-n-dodecylsilane ($\overline{Mn}$=2180 g/mole by GPC) in 150 ml of xylene and in the presence of 0.6 g (4.2 mmoles) of di-t-butyl peroxide. A white product is obtained.

Melting point: 55–60° C.

$\overline{Mn}$=3810 g/mole by GPC

The NMR and IR analyses confirm the above structure.

The individual recurring units can have a random, alternate or block distribution.

EXAMPLE I-17

Preparation of a Polysilane Compound of the Formula

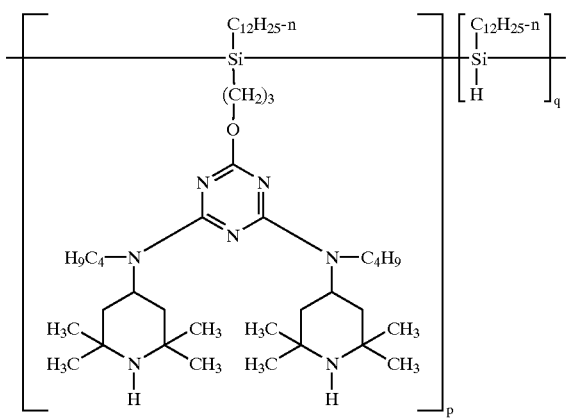

with a p:q molar ratio of 1:1.5.

In analogy to the method described in Example I-8, 7.3 g (13.1 mmoles) of 6-allyloxy-N,N'-dibutyl-N,N'-bis(2,2,6,6-tetramethyl-4-piperidyl)-[1,3,5]-triazine-2,4-diamine are reacted with 6.6 g (3.0 mmoles) of dihydroterminated polyhydro-n-dodecylsilane ($\overline{Mn}$=2180 g/mole by GPC) in 110 ml of xylene and in the presence of 0.15 g (1 mmole) of di-t-butyl peroxide. A yellowish resin is obtained.

$\overline{Mn}$=3200 g/mole by GPC

FT-IR: Si—H peak at 2100 cm$^{-1}$.

NMR: 0.8–1.8 ppm (m, 102H); 3.26 ppm (m, 4H); 4.18 ppm (m, 2H); 5.22 ppm (m, 1H).

The individual recurring units can have a random, alternate or block distribution.

EXAMPLE I-18

Preparation of a Polysilane Compound of the Formula

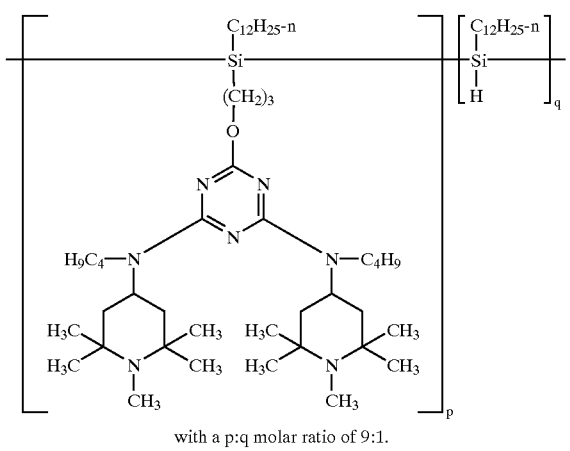

with a p:q molar ratio of 9:1.

In analogy to the method described in Example I-8, 11.9 g (20.4 mmoles) of 6-allyloxy-N,N'-dibutyl-N,N'-bis(1,2,2,6,6-pentamethyl-4-piperidyl)-[1,3,5]-triazine-2,4-diamine are reacted with 4.8 g (2.2 mmoles) of dihydroterminated polyhydro-n-dodecylsilane ($\overline{Mn}$=2180 g/mole by GPC) in 150 ml of xylene and in the presence of 0.6 g (4.2 mmoles) of di-t-butyl peroxide. A yellowish resin is obtained.

$\overline{Mn}$=3840 g/mole by GPC

FT-IR: Si—H peak at 2087 cm$^{-1}$.

NMR: 0.8–1.8 ppm (m, 75H); 2.22 ppm (s, 6H); 3.25 ppm (m, 4H); 4.18 ppm (m, 2H); 5.11 ppm (m, 1H).

The individual recurring units can have a random, alternate or block distribution.

EXAMPLE I-19

Preparation of a Polysilane Compound of the Formula

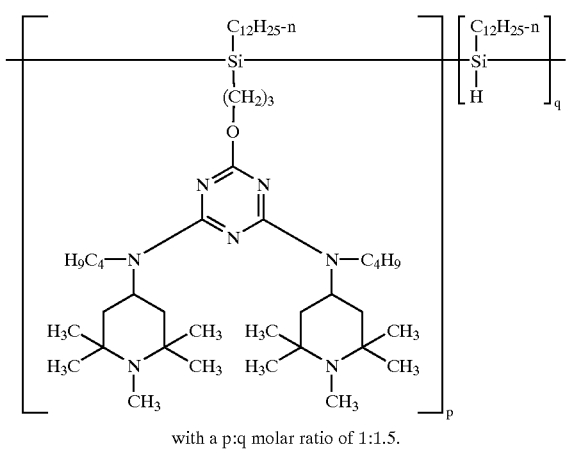

with a p:q molar ratio of 1:1.5.

In analogy to the method described in Example I-8, 7.6 g (13.1 mmoles) of 6-allyloxy-N,N'-dibutyl-N,N'-bis(1,2,2,6,6-pentamethyl-4-piperidyl)-[1,3,5]-triazine-2,4-diamine are reacted with 6.6 g (3.0 mmoles) of dihydroterminated polyhydro-n-dodecylsilane ($\overline{Mn}$=2180 g/mole by GPC) in 110 ml of xylene and in the presence of 0.15 g (1 mmole) of di-t-butyl peroxide. A yellowish resin is obtained.

$\overline{Mn}$=3115 g/mole by GPC

FT-IR: Si—H peak at 2110 cm$^{-1}$.

NMR: 0.8–1.8 ppm (m, 100H); 2.22 ppm (s, 6H); 3.25 ppm (m, 4H); 4.18 ppm (m, 2H); 5.11 ppm (m, 1H).

The individual recurring units can have a random, alternate or block distribution.

EXAMPLE I-20

Preparation of a Polysilane Compound of the Formula

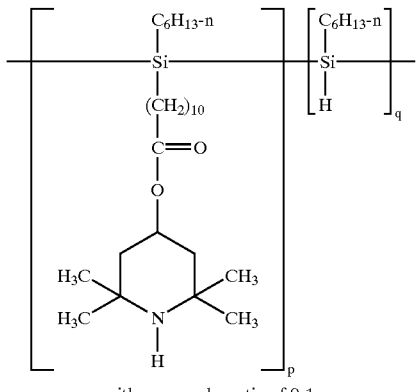

with a p:q molar ratio of 9:1.

12.7 g (39.2 mmoles) of undec-11-enoic acid 2,2,6,6-tetramethyl-4-piperidyl ester and 5.2 g (4.2 mmoles) of dihydroterminated polyhydro-n-hexylsilane ($\overline{Mn}$=1230 g/mole by GPC) are dissolved in 180 ml of xylene. The mixture is cooled to −20° C. and purged with N$_2$. 0.29 g (2 mmoles) of di-t-butyl peroxide are added and the mixture is heated, slowly and under stirring, to 140° C. for 3 hours. Subsequently, the mixture is cooled to 0° C. and further 0.58 g (4 mmoles) of di-t-butyl peroxide are added. Then, the mixture is heated to 140° C. for 8 hours. The mixture is evaporated under vacuum (40° C./1 mbar). The resinous residue is taken up with 60 ml of acetonitrile. After stirring for 1 hour at 50° C., the organic phase is separated off and the resinous residue is dried in an oven under vacuum (40° C./1 mbar). A light yellow resin is obtained.

$\overline{Mn}$=3545 g/mole by GPC

NMR: 0.7–1.8 ppm (m, 48H); 2.25 ppm (t, 2H); 5.18 ppm (m, 1H).

The individual recurring units can have a random, alternate or block distribution.

Example I-21

Preparation of a Polysilane Compound of the Formula

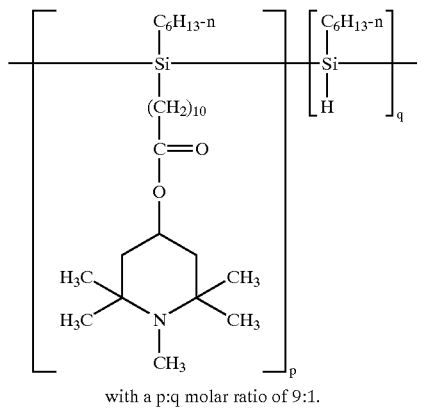

with a p:q molar ratio of 9:1.

In analogy to the method described in Example I-20, 7.8 g (23.3 mmoles) of undec-11-enoic acid 1,2,2,6,6-pentamethyl-4-piperidyl ester are reacted with 3.2 g (2.5 mmoles) of dihydroterminated polyhydro-n-hexylsilane ($\overline{Mn}$=1230 g/mole by GPC) in 100 ml of xylene and in the presence of 0.33 g (2.3 mmoles) of di-t-butyl peroxide. A light yellow resin is obtained.

$\overline{Mn}$=3650 g/mole by GPC

NMR: 0.7–1.8 ppm (m, 47H); 2.21 ppm (m, 5H); 5.08 ppm (m, 1H).

The individual recurring units can have a random, alternate or block distribution.

EXAMPLE II-1
A) Preparation of the Intermediate of the Formula

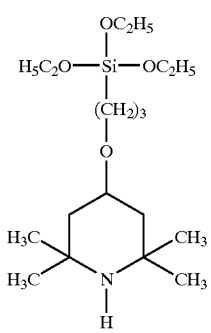

70 g (0.355 mol) of 4-allyloxy-2,2,6,6-tetramethylpiperidine are stirred at room temperature for 0.5 hours in the presence of chloroplatinic acid dissolved in isopropanol (1.5 ml of 2% weight solution of $H_2PtCl_6 \times 6H_2O$). The reaction mixture is heated to 60° C. and 64 g (0.39 mol) of triethoxysilane are added dropwise in 45 minutes. Subsequently, the reaction mixture is maintained under stirring at 70° C. for 5 hours. Then, the reaction mixture which appear as an oil is transferred into a Claisen apparatus and 92 g (assay by GC=97%) of an oily product are obtained by distillation under vacuum (132° C./0.2 mbar). The NMR and FT-IR analyses confirm the desired structure.

B) Preparation of the Intermediate of the Formula

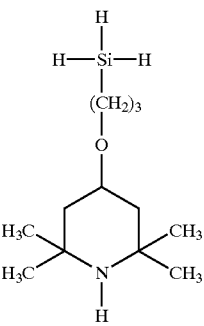

In a separate apparatus 8.1 g (0.213 mol) of $LiAlH_4$ in 700 ml of ethyl ether are suspended and cooled down to 0° C. 70 g (0.193 mol) of the intermediate of Example II-1A are added dropwise in 1 hour, keeping the temperature at 0° C. The reaction mixture is maintained at 0° C. for two more hours. Then, the solvent is distilled off under vacuum and 500 ml of n-hexane are added to the residue. The mixture is filtered, the organic layer is concentrated and distilled under vacuum, and 31 g of a colorless oil are obtained (boiling point: 75° C./0.5 mbar; assay by GC=97%). The NMR and FT-IR analyses confirm the desired structure.

C) Preparation of the Polysilane Compound of the Formula

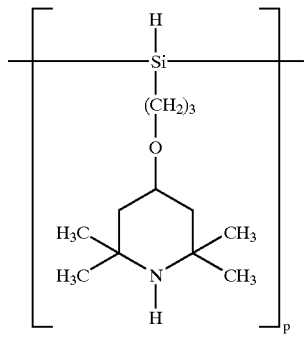

100 ml of toluene and 0.92 g (3.14 mmol) of bis(cyclopentadienyl)zirconium dichloride are cooled between −10° C. and 0° C. 2.5 ml (6.28 mmol) of BuLi in n-hexane (2.5 M) are added and the mixture is stirred at the same temperature for 0.5 hours. Subsequently, 40 g (0.174 mol) of the intermediate of Example II-1B are added in 45 minutes at 0° C. Then, the reaction mixture is allowed to heat to room temperature and is subsequently heated to 55° C. for 50 hours. Afterwards, the solution is diluted with 300 ml of toluene and treated with 10 g of ®TONSYL under stirring for 1 hour. Then, the suspension is filtered off and the organic layer is concentrated under vacuum. 34.4 g of a colorless resinous oil are obtained.

$\overline{Mn}$=2100 g/mol by GPC

FT-IR: Si—H peak at 2074 $cm^{-1}$.

NMR: 0.6 ppm (s, 1H); 0.9 ppm (m, 4H); 1.05–1.10 ppm (m, 12H); 1.6 ppm (m, 2H); 1.8 ppm (m, 2H); 3.3 ppm (m, 2H); 3.7 ppm (m, 2H).

EXAMPLE II-2

A) Preparation of the Intermediate of the Formula

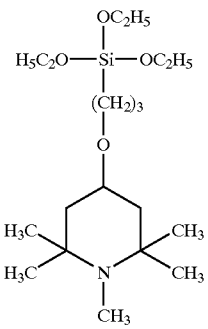

50 g (0.236 mol) of 4-allyloxy-1,2,2,6,6-pentamethylpiperidine dissolved in 50 ml of tetrahydrofuran are stirred at room temperature for 0.5 hours in the presence of chloroplatinic acid in isopropanol (2.4 ml of a 2% weight solution of $H_2PtCl_6 \times 6H_2O$). The reaction mixture is heated to 60° C. and 44.5 g (0.271 mol) of triethoxysilane are added dropwise in 45 minutes. Then, the reaction mixture is maintained under stirring at 60° C. for 5 hours. The reaction mixture is distilled in a Claisen apparatus under vacuum (138–140° C./0.3 mbar) and 48.4 g (assay by GC=94%) of the desired product are obtained. The NMR and FT-IR analyses confirm the desired structure.

B) Preparation of the Intermediate of the Formula

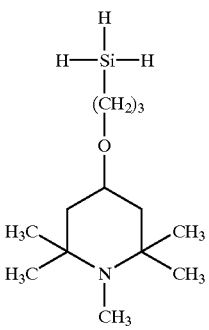

In a separate apparatus 4.8 g (0.127 mol) of $LiAlH_4$ are suspended in 500 ml of ethyl ether and 48 g (0.127 mol) of the intermediate of Example II-2A are added dropwise in 45 minutes, keeping the reaction mixture at room temperature. Then, the reaction mixture is refluxed for 2 hours, the solvent is distilled off under vacuum, and 300 ml of n-hexane are added to the residue. The mixture is filtered, the organic layer is concentrated and distilled under vacuum (80° C./0.5 mbar), and 16 g of a colorless oil are obtained (assay by GC=94%). The NMR and FT-IR analyses confirm the desired structure.

C) Preparation of the Polysilane Compound of the Formula

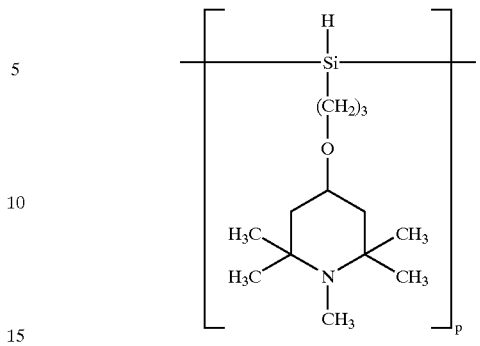

120 ml of toluene and 1 g (3.5 mmol) of bis(cyclopentadienyl)zirconium dichloride are cooled between −10° C. and 0° C. Then, 2.84 ml (7.1 mmol) of BuLi in n-hexane (2.5 M) are added and the mixture is stirred at the same temperature for 0.5 hours. 50 g (0.205 mol) of the intermediate of Example II-2B are added in 45 minutes at 0° C. Subsequently, the reaction mixture is allowed to cool to room temperature and is then heated to 55° C. for 30 hours. Afterwards, the solution is diluted with 300 ml of toluene and treated with 10 g of ®TONSYL under stirring for 1 hour. Then, the suspension is filtered off and the organic layer is concentrated under vacuum. 45 g of a colorless resinous product are obtained.

$\overline{Mn}$=2090 g/mol by GPC

FT-IR: Si—H peak at 2081 $cm^{-1}$.

NMR: 0.8 ppm (m, 2H); 0.9–1.11 ppm (m, 12H); 1.3–1.8 ppm (m, 6H); 1.65 ppm (m, 2H); 2.1 ppm (s, 3H); 3.36 ppm (m, 2H).

EXAMPLE II-3

Preparation of the Polysilane Compound of the Formula

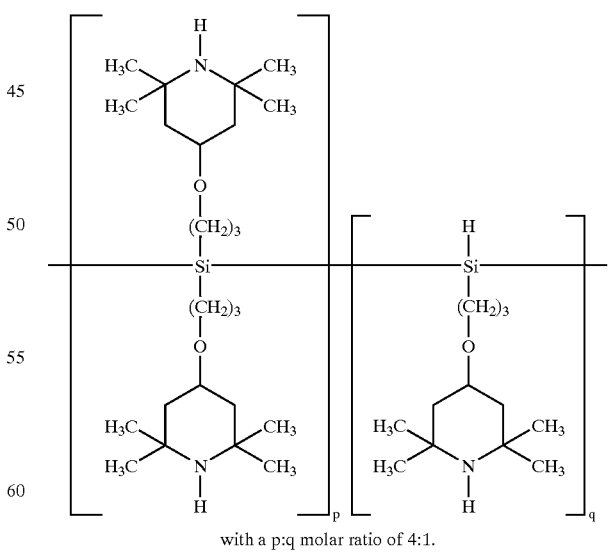

with a p:q molar ratio of 4:1.

10.5 g (5.5 mmol) of the compound of Example II-1C and 7.3 g (36.9 mmol) of 4-allyloxy-2,2,6,6-tetramethylpiperidine are dissolved in 180 ml of xylene. The reaction mixture is cooled to −20° C. and is degassed under vacuum for 0.5 hours. Then, the reaction mixture is allowed to heat to room temperature and 0.6 ml of tert-butyl peroxide are added. The mixture is heated to 130° C. and is kept at this temperature for 8 hours. Subsequently, the reaction mixture is cooled down to room temperature, 2 g of ®TONSYL are added and the suspension is stirred for 0.5 hours. After filtration, the organic layer is concentrated in vacuum (21 mbar) and 13.8 g of a pale yellow resinous product are obtained.

$\overline{Mn}$=2530 g/mol by GPC

FT-IR: Si—H peak at 2082 cm$^{-1}$.

EXAMPLE II-4

Preparation of the Polysilane Compound of the Formula

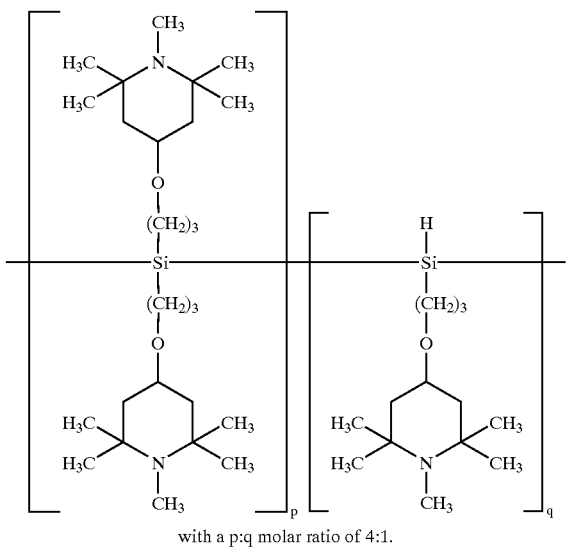

with a p:q molar ratio of 4:1.

In analogy to the method described in Example II-3, 12 g (5.7 mmol) of the compound of Example II-2C, 8.4 g (40 mmol) of 4-allyloxy-1,2,2,6,6-pentamethylpiperidine, 190 ml of xylene and 0.9 ml of tert-butyl peroxide are reacted. 19.5 g of a colorless resinous product are obtained.

$\overline{Mn}$=2600 g/mol by GPC

FT-IR: Si—H peak at 2090 cm$^{-1}$.

NMR: 0.75 ppm (m, 6H); 0.9–1.12 ppm (s, 36H); 1.2–1.8 ppm (m, 12H); 1.6 ppm (m, 6H); 2.1 ppm (s, 9H); 3.3 ppm (m, 10H).

EXAMPLE II-5

A) Preparation of the Intermediate of the Formula

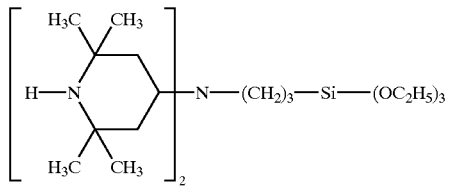

In a closed vessel, 28.5 g (85 mmol) of allyl-bis(2,2,6,6-tetramethylpiperidin-4-yl)amine and 0.138 g of PtCl$_2$ (PhCH=CH$_2$)$_2$ are dissolved in 50 ml of tetrahydrofuran and the reaction mixture is stirred at room temperature for 0.5 hours. Then, 20.9 g (0.127 mol) of triethoxysilane are added and the reaction mixture is heated to 70° C. for 3 hours and then to 110° C. for three more hours. After cooling to room temperature, the solvent and the excess of reagent are removed in vacuum and the residue is distilled (160–165° C./0.1 mbar). 20 g of a pale yellow resin (assay by GC=94%) are obtained. The NMR and FT-IR analyses confirm the desired structure.

B) Preparation of the Intermediate of the Formula

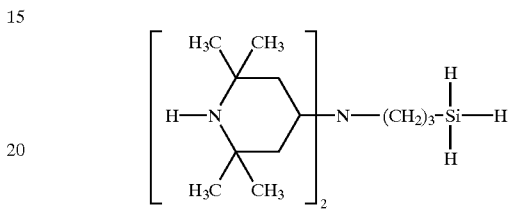

In a separate apparatus and in analogy to the method described in Example 1B. 54.6 g (0.109 mol) of the intermediate of Example II-5A are reacted with 4.5 g (0.112 mol) of LiAlH$_4$. 30.5 g of a yellow oil are obtained (boiling point: 130–135° C./0.1 mbar; assay by GC=90%). The NMR and FT-IR analyses confirm the desired structure.

C) Preparation of the Polysilane Compound of the Formula

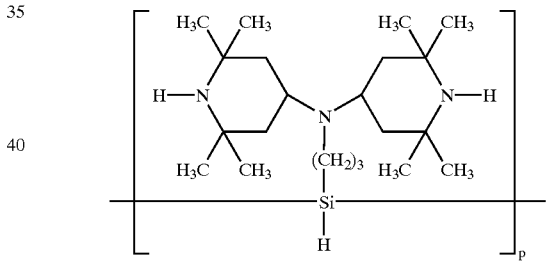

75 ml of toluene and 0.64 g (2.2 mmol) of bis (cyclopentadienyl)zirconium dichloride are cooled between −10° C. and 0° C. Then, 1.8 ml (4.4 mmol) of BuLi in n-hexane (2.5 M) are added and the mixture is stirred at the same temperature for 0.5 hours. 22.5 g (61.3 mmol) of the intermediate of Example II-5B are added dropwise in 30 minutes at 0° C. The reaction mixture is allowed to heat to room temperature and is then heated to 90° C. for 40 hours. Afterwards, the solution is diluted with 200 ml of toluene and treated with 5 g of ®TONSYL under stirring for 1 hour. The suspension is filtered off and the organic layer is concentrated under vacuum (21 mbar). 20 g of a white solid product are obtained.

$\overline{Mn}$=1930 g/mol by GPC

Melting range: 69–73° C.

FT-IR: Si—H peak at 2068 cm$^{-1}$.

EXAMPLE II-6
A) Preparation of the Intermediate of the Formula

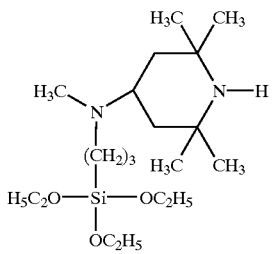

In a closed vessel, 70 g (0.33 mol) of allyl-methyl-(2,2,6,6-tetramethylpiperidin-4-yl)amine and 100 mg of $PtCl_2(PhCH=CH_2)_2$ are stirred at room temperature for 0.5 hours. Then, 80.5 g (0.49 mol) of triethoxysilane are added and the reaction mixture is heated to 120° C. for 6 hours. After cooling to room temperature, the excess of reagent is removed under vacuum (21 mbar) and the residue is distilled (125° C./2 mbar). 52.3 g of a pale yellow oil (assay by GC=96%) are obtained. The NMR and FT-IR analyses confirm the desired structure.

B) Preparation of the Intermediate of the Formula

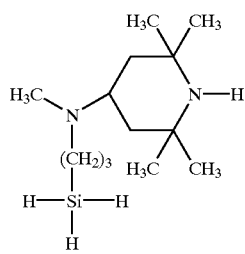

In a separate apparatus and in analogy to the method described in Example II-1B, 50 g (0.133 mol) of the intermediate of Example II-6A are reacted with 5.6 g (0.146 mol) of $LiAlH_4$. 21 g of a colorless oil are obtained (boiling point: 80° C./2 mbar). The NMR and FT-IR analyses confirm the desired structure.

C) Preparation of the Polysilane Compound of the Formula

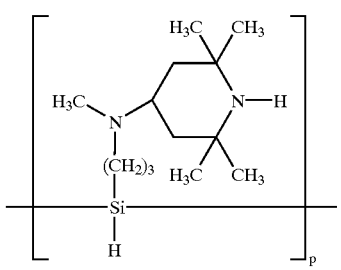

50 ml of toluene and 0.43 g (1.48 mmol) of bis(cyclopentadienyl)zirconium dichloride are cooled between −10° C. and 0° C. Then, 1.18 ml (2.96 mmol) of BuLi in n-hexane (2.5 M) are added and the mixture is stirred at the same temperature for 0.5 hours. 20 g (0.082 mol) of the compound of Example II-6B are added dropwise in 30 minutes at 0° C. Then, the reaction mixture is allowed to heat to room temperature and is subsequently heated to 90° C. for 50 hours. Afterwards, the solution is diluted with 200 ml of toluene and treated with 4 g of ®TONSYL under stirring for 1 hour. Then, the suspension is filtered off and the organic layer is concentrated under vacuum (21 mbar). 17.5 g of a yellow resinous product are obtained.

$\overline{Mn}$=1880 g/mol by GPC

FT-IR: Si—H peak at 2089 $cm^{-1}$.

NMR: 0.7 ppm (m, 3H); 0.9–1.5 ppm (m, 4H); 1.0–1.1 ppm (m, 12H); 1.4 ppm (m, 2H); 2.1 ppm (s, 3H); 2.3 ppm (m, 2H); 2.75 ppm (m, 1H); 3.5 ppm (m, 1H).

EXAMPLE II-7
A) Preparation of the Intermediate of the Formula

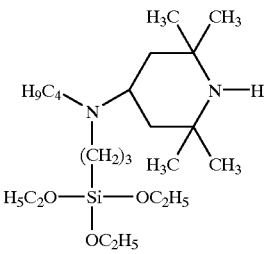

In analogy to the method described in Example II-6A, 90 g (0.356 mol) of allyl-butyl-(2,2,6,6-tetramethylpiperidin-4-yl)amine, 100 mg of $PtCl_2(PhCH=CH_2)_2$ and 87.9 g of triethoxysilane are reacted. 76 g of a pale yellow liquid (boiling point: 133–135° C./2 mbar; assay by GC=98.7%) are obtained. The NMR and FT-IR are consistent with the desired structure.

B) Preparation of the Intermediate of the Formula

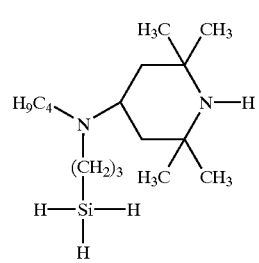

In a separate apparatus and in analogy to the method described in Example 6B, 65 g (0.156 mol) of the intermediate of Example II-7A are reacted with 6.5 g (0.17 mol) of $LiAlH_4$. 24.4 g of a colorless liquid are obtained (boiling point: 118–121° C./11 mbar). The NMR and FT-IR analyses confirm the desired structure.

C) Preparation of the Polysilane Compound of the Formula

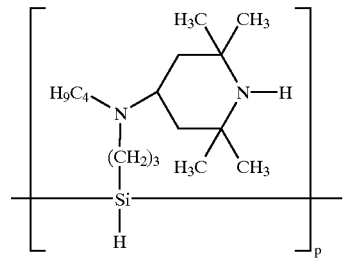

In analogy to the method described in Example II-6C, 22 g (0.077 mol) of the intermediate of Example II-7B, 0.41 g (1.4 mmol) of bis(cyclopentadienyl)zirconium dichloride, 1.12 ml of BuLi in n-hexane (2.5 M) and 33 ml of toluene are reacted. After adding further 150 ml of toluene and treating with 3 g of ®TONSYL, 18.5 g of a pale yellow resinous product are obtained.

$\overline{Mn}$=1870 g/mol by GPC

FT-IR: Si—H peak at 2089 cm$^{-1}$.

EXAMPLE II-8

Preparation of the Polysilane Compound of the Formula

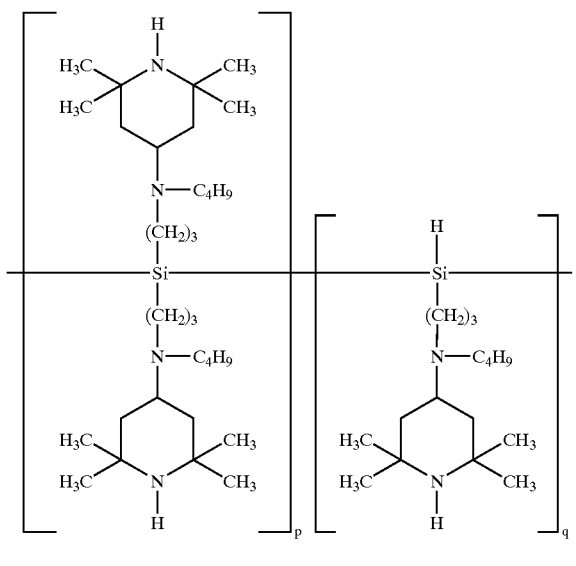

with a p:q molar ratio of 4:1.

15.4 g (8.2 mmol) of the compound of Example II-7, 11 g (43.5 mmol) of allyl-butyl-(2,2,6,6-tetramethylpiperidin-4-yl)amine and 260 ml of xylene are introduced in a glass reactor. The solution is cooled down to −30° C. under N$_2$ and 0.318 g (2.2 mmol) of tert-butyl peroxide are added. Then, the reaction mixture is allowed to heat to room temperature and is subsequently heated to 130–135° C. for 8 hours. The mixture is cooled down to room temperature, 2 g of ®TONSYL are added and the suspension is stirred for 0.5 hours. Then, the reaction mixture is filtered, the organic layer is distilled under vacuum (21 mbar) and the residue is dried under vacuum (22 mbar). 22 g of a yellow resinous product are obtained.

$\overline{Mn}$=2275 g/mol by GPC

FT-IR: Si—H peak at 2092 cm$^{-1}$.

EXAMPLE II-9

A) Preparation of the Intermediate of the Formula

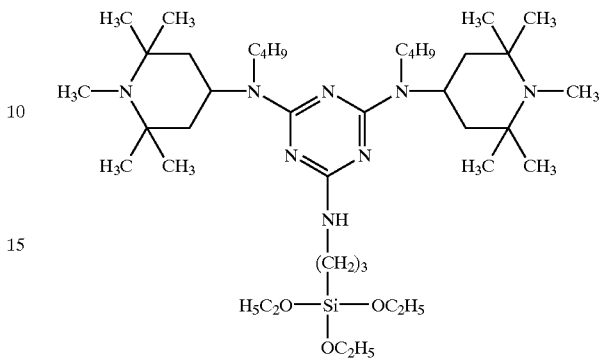

80 g (0.141 mol) of N,N'-dibutyl-6-chloro-N,N'-bis(1,2,2,6,6-pentamethylpiperidin-4-yl)-[1,3,5]-triazine-2,4-diamine are dissolved in 500 ml of 2-methoxyethyl ether. The solution is heated to 140° C. and 40.7 g (0.184 mol) of 3-amino-propyl-triethoxysilane are added dropwise during 45 minutes. The reaction mixture is kept at reflux for 14 hours. Then, the reaction mixture is cooled down and the solvent is distilled off under vacuum. 111 g of the product are obtained. The NMR and FT-IR analyses confirm the desired structure.

B) Preparation of the Intermediate of the Formula

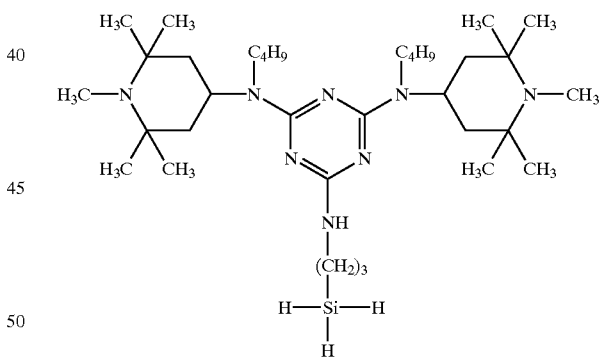

In a separate apparatus, 400 ml of ethyl ether and 3.9 g (0.102 mol) of LiAlH$_4$ are suspended and cooled to −10° C. Then, 40 g (51 mmol) of the intermediate of Example II-9A are added in small portions during 2 hours, keeping the temperature between −10° and 0° C. The mixture is allowed to heat to room temperature and is stirred for 5 hours. Subsequently, the solvent is distilled off and 500 ml of n-hexane are added. The suspension is filtered and the organic layer is concentrated. 25 g of a resinous product are obtained. The NMR and FT-IR analyses confirm the desired structure.

C) Preparation of the Polysilane Compound of the Formula

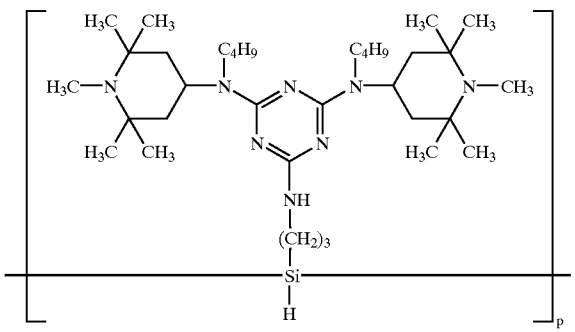

30 ml of toluene and 0.52 g (1.81 mmol) of bis(cyclopentadienyl)zirconium dichloride are mixed and are cooled to −10° C. Then, 1.44 ml (3.62 mmol) of BuLi in n-hexane (2.5 M) are added and the mixture is kept under stirring for 1 hour. A solution of 31 g (50.3 mmol) of the intermediate of Example II-9B in 60 ml of toluene is added dropwise during 30 minutes at 0° C. The mixture is allowed to heat to room temperature and is heated to 100° C. for 96 hours. Then, the solution is diluted with 200 ml of toluene and treated with 5 g of ®TONSYL under stirring for 1 hour. The suspension is filtered and the solvent is removed under vacuum. 24 g of a pale yellow solid are obtained.

$\overline{Mn}$=2730 g/mol by GPC
Melting point: 135–139° C.

EXAMPLE I-I

Light Stabilizing Action in Polypropylene Fibers 2.5 g of the stabilizer indicated in Table I-1, 1.0 g of tris(2,4-di-t-butylphenyl)phosphite, 1.0 g of calcium monoethyl 3,5-di-t-butyl-4-hydroxybenzyl phosphonate, 1.0 g of calcium stearate and 2.5 g of titanium dioxide are mixed in a slow mixer with 1000 g of polypropylene powder having a melt index of 12 g/10 min (measured at 230° C. and 2.16 kg).

The mixtures are extruded at 190–230° C. to obtain polymer granules which are then converted into fibers using a pilot-type apparatus (®Leonard-Sumirago (VA), Italy) and operating under the following conditions:

| | |
|---|---|
| extruder temperature: | 230–245° C. |
| head temperature: | 255–260° C. |
| draw ratio: | 1:3.5 |
| linear density: | 11 dtex per filament |

The fibers prepared in this way are exposed, after mounting on white cardboard, in a 65 WR Weather-O-Meter (ASTM D2565-85) with a black panel temperature of 63° C.

For samples taken after various times of exposure to the light, the residual tenacity is measured using a constant-speed tensometer and the exposure time in hours needed to halve the initial tenacity ($T_{50}$) is then calculated.

For purposes of comparison, fibers prepared under the same conditions as stated above, but without adding the stabilizers of the present invention, are also exposed.

The results are shown in Table I-1.

TABLE I-1

| Stabilizer | *) $T_{50}$ (hours) |
|---|---|
| Without stabilizers | 250 |
| Compound of Example I-1 | 2150 |
| Compound of Example I-3 | 2550 |
| Compound of Example I-4 | 2590 |
| Compound of Example I-6 | 2530 |
| Compound of Example I-9 | 2410 |
| Compound of Example I-11 | 2530 |
| Compound of Example I-12 | 2530 |

*) High values reveal a good stabilization.

EXAMPLE II-I

Light Stabilizing Action in Polypropylene Multifilaments 2.5 g of each stabilizer listed in Table II-1 is mixed with 1 g of tris(2,4-di-tert-butylphenyl)phosphite, 1 g of calcium monoethyl 3,5-di-tert-butyl-4-hydroxybenzyl phosphonate, 1 g of calcium stearate and 2.5 g of titanium dioxide in a turbo mixer with 1000 g of polypropylene powder (PP ®Moplen FLF 20) having a melt index of 12 g/10 min (measured at 230° C. and 2.16 Kg).

The mixture is extruded at 190–230° C. to give polymer granules which are subsequently converted into multifilaments using a pilot-type apparatus (®Leonard-Sumirago (VA)—Italy) and working under the following conditions:

| | |
|---|---|
| Extruder temperature: | 230–245° C. |
| Head temperature: | 255–260° C. |
| Draw ratio: | 1:3.5 |
| Linear density: | 11 dtex per filament |

The multifilaments thus prepared are mounted on a white cardboard and are exposed in a Weather-O-Meter 65 WR (ASTM G 26-96) with a black panel temperature of 63° C.

The residual tensile strength is measured, by means of a constant velocity tensometer, on a sample taken after various light exposure times. From this, the exposure time (in hours) required to halve the initial tensile strength ($T_{50}$) is calculated.

By way of comparison, multifilaments prepared under the same conditions as indicated above, but without the addition of the stabilizers of the present invention, are exposed.

The results obtained are shown in the Table II-1.

TABLE II-1

| Stabilizer | *) $T_{50}$ in hours |
|---|---|
| — | 220 |
| Compound of Example II-1C | 2800 |
| Compound of Example II-2C | 2800 |
| Compound of Example II-3 | 3070 |
| Compound of Example II-4 | 3330 |
| Compound of Example II-5C | 2170 |
| Compound of Example II-6C | 1810 |

TABLE II-1-continued

| Stabilizer | *)T₅₀ in hours |
|---|---|
| Compound of Example II-8 | 1670 |
| Compound of Example II-9C | 1810 |

*)High values reveal a good stabilization.

EXAMPLE II-II

Light Stabilizing Action in Polypropylene Tapes 1 g of each stabilizer listed in Table II-2 and 1 g of calcium stearate are mixed in a turbomixer with 1000 g of polypropylene powder (PP ®MOPLEN S30S) having a melt index of 2.1 g/10 min (measured at 230° C. and 2.16 Kg).

The mixture is extruded at 190–230° C. to give polymer granules which are subsequently converted to stretched tapes of 50 microns thickness and 2.5 mm width, using a semi industrial type of apparatus (®Leonard-Sumirago (VA)—Italy) and working under the following conditions:

| | |
|---|---|
| Extruder temperature: | 210–230° C. |
| Head temperature: | 240–260° C. |
| Stretch ratio: | 1:6 |

The tapes thus prepared are mounted on a white card and are exposed in a Weather-C-Meter 65 WR (ASTM G 26-96) with a black panel temperature of 63° C.

The residual tensile strength is measured, by means of constant velocity tensometer, on a sample taken after various light exposure times. From this, the exposure time (in hours) required to halve the initial tensile strength ($T_{50}$) is calculated.

By way of comparison, tapes prepared under the same conditions as indicated above, but without the addition of the stabilizers of the present invention, are exposed.

The results obtained are shown in the Table II-2.

TABLE II-2

| Stabilizer | *)T₅₀ in hours |
|---|---|
| — | 420 |
| Compound of Example II-1C | 2620 |
| Compound of Example II-2C | 2520 |
| Compound of Example II-3 | 2870 |
| Compound of Example II-4 | 2660 |
| Compound of Example II-5C | 2520 |
| Compound of Example II-6C | 2310 |
| Compound of Example II-8 | 2090 |
| Compound of Example II-9C | 1590 |

*)High values reveal a good stabilization.

What is claimed is:

1. A compound containing a polysilane backbone with more than two Si atoms and a group of the formula

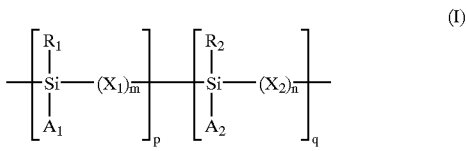

wherein R is hydrogen, $C_1$–$C_8$alkyl, —O·, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl.

2. A compound of the formula (I)

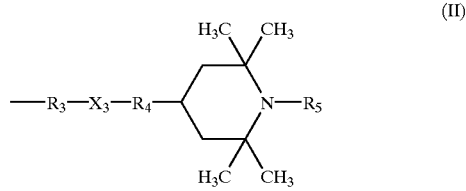

in which p is a number from 2 to 100 and q is zero or a number from 2 to 90;

m and n independently of one another are zero or 1;

$R_1$ and $R_2$ independently of one another are a group of the formula (II) or (III) as defined below, or hydrogen, $C_1$–$C_{18}$alkyl, $C_5$–$C_{12}$cycloalkyl unsubstituted or substituted by 1, 2 or 3 $C_1$–$C_4$alkyl or $C_{1-C4}$alkoxy; phenyl unsubstituted or substituted by 1, 2 or 3 $C_1$–$C_4$alkyl or $C_1$–$C_4$alkoxy; $C_7$–$C_9$phenylalkyl unsubstituted or substituted on the phenyl by 1, 2 or 3 $C_1$–$C_4$alkyl or $C_1$–$C_4$alkoxy;

$X_1$ and $X_2$ independently of one another are $C_2$–$C_{12}$alkylene;

$A_1$ is a group of the formula (II) or (III)

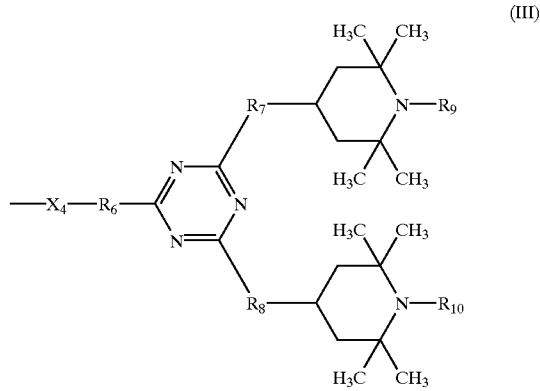

wherein

R$_3$ is a direct bond or C$_2$–C$_{12}$alkylene,

R$_4$, R$_6$, R$_7$ and R$_8$ independently of one another are —O— or >N—R$_{11}$ with R$_{11}$ being hydrogen, C$_1$–C$_8$alkyl, C$_5$–C$_{12}$cycloalkyl or a group of the formula (IV),

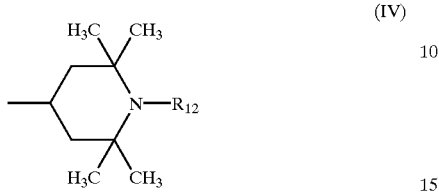

(IV)

R$_5$, R$_9$, R$_{10}$ and R$_{12}$ independently of one another are hydrogen, C$_1$–C$_8$alkyl, —O·, —OH, —CH$_2$CN, C$_1$–C$_{18}$alkoxy, C$_5$–C$_{12}$cycloalkoxy, C$_3$–C$_6$alkenyl, C$_7$–C$_9$phenylalkyl unsubstituted or substituted on the phenyl by 1, 2 or 3 C$_1$–C$_4$alkyl; or C$_1$–C$_8$acyl, X$_3$ is a direct bond or >C=O, and X$_4$ is C$_2$–C$_{12}$alkylene;

A$_2$ is a group of the formula (II) or (III), or hydrogen, C$_1$–C$_{12}$alkyl, C$_5$–C$_{12}$cycloalkyl unsubstituted or substituted by 1, 2 or 3 C$_1$–C$_4$alkyl or C$_1$–C$_4$alkoxy; and each of the radicals R$_1$, R$_2$, X$_1$, X$_2$, A$_1$ and A$_2$ as well as each of the variables m and n can have the same or a different meaning in the individual recurring units of the formula (I); and when the compounds of the formula (I) are copolymeric, they can have a random, alternate or block distribution of the individual recurring units.

3. A compound according to claim 2 wherein R$_5$, R$_9$, R$_{10}$ and R$_{12}$ independently of one another are hydrogen, C$_1$–C$_4$alkyl, —OH, C$_6$–C$_{12}$alkoxy, C$_5$–C$_8$cycloalkoxy, allyl, benzyl or acetyl.

4. A compound according to claim 2 wherein R$_5$, R$_9$, R$_{10}$ and R$_{12}$ independently of one another are hydrogen or C$_1$–C$_4$alkyl.

5. A compound according to claim 2 wherein R$_1$ and R$_2$ independently of one another are C$_1$–C$_{16}$alkyl or phenyl.

6. A compound according to claim 2 wherein m and n are zero.

7. A compound according to claim 2 wherein m and n are zero and R$_1$ is hydrogen or a group of the formula (II).

8. A compound according to claim 2 wherein X$_3$ is a direct bond.

9. A compound according to claim 2 wherein

R$_2$ is hydrogen, C$_1$–C$_{16}$alkyl, C$_5$–C$_8$cycloalkyl unsubstituted or substituted by methyl; phenyl or benzyl;

X$_1$ and X$_2$ independently of one another are C$_2$–C$_8$alkylene;

A$_1$ is a group of the formula (II) or (III) wherein

R$_3$ is C$_2$–C$_{10}$alkylene, and

R$_4$, R$_6$, R$_7$ and R$_8$ independently of one another are —O— or >N—R$_{11}$ with the radicals R$_{11}$ independently of one another being hydrogen, C$_1$–C$_6$alkyl or a group of the formula (IV); and A$_2$ is hydrogen, a group of the formula (II), C$_1$–C$_8$alkyl or C$_5$–C$_8$cycloalkyl.

10. A compound according to claim 2 wherein m and n are zero;

R$_1$ is hydrogen or a group of the formula (II);

R$_2$ is hydrogen;

A$_1$ is a group of the formula (II) or (III);

A$_2$ is a group of the formula (II);

R$_3$ is C$_2$–C$_{10}$alkylene,

R$_4$, R$_6$, R$_7$ and R$_8$ independently of one another are —O— or >N—R$_{11}$ with the radicals R$_{11}$ independently of one another being hydrogen, C$_1$–C$_4$alkyl or a group of the formula (IV), X$_3$ is a direct bond, and X$_4$ is C$_2$–C$_{10}$alkylene.

11. A compound according to claim 2 wherein

R$_1$ and R$_2$ independently of one another are C$_1$–C$_{16}$alkyl, C$_5$–C$_8$cycloalkyl unsubstituted or substituted by methyl; phenyl or benzyl;

X$_1$ and X$_2$ independently of one another are C$_2$–C$_8$alkylene;

A$_1$ is a group of the formula (II) or (III) wherein

R$_3$ is C$_2$–C$_{10}$alkylene, and

R$_4$, R$_6$, R$_7$ and R$_8$ independently of one another are —O— or >N—R$_{11}$ with R$_{11}$ being hydrogen, C$_1$–C$_6$alkyl or a group of the formula (IV); and A$_2$ is hydrogen, C$_1$–C$_8$alkyl or C$_5$–C$_8$cycloalkyl.

12. A compound according to claim 2 wherein

R$_1$ and R$_2$ independently of one another are C$_1$–C$_{12}$alkyl or phenyl;

A$_1$ is a group of the formula (II) or (III) wherein

R$_3$ is C$_2$–C$_{10}$alkylene,

R$_4$, R$_6$, R$_7$ and R$_8$ independently of one another are —O— or >N—R$_{11}$ with R$_{11}$ being hydrogen or C$_1$–C$_4$alkyl, and X$_4$ is C$_2$–C$_{10}$alkylene; and A$_2$ is hydrogen.

13. A compound according to claim 2 wherein m and n are zero;

R$_1$ is hydrogen, C$_1$–C$_{12}$alkyl, phenyl or a group of the formula (II);

R$_2$ is hydrogen, C$_1$–C$_{12}$alkyl or phenyl;

A$_1$ is a group of the formula (II) or (III);

A$_2$ is hydrogen or a group of the formula (II);

R$_3$ is C$_2$–C$_{10}$alkylene,

R$_4$, R$_6$, R$_7$ and R$_8$ independently of one another are —O— or >N—R$_{11}$ with the radicals R$_{11}$ independently of one another being hydrogen, C$_1$–C$_4$alkyl or a group of the formula (IV), and X$_4$ is C$_2$–C$_{10}$alkylene.

14. A compound according to claim 2 which corresponds to the formula

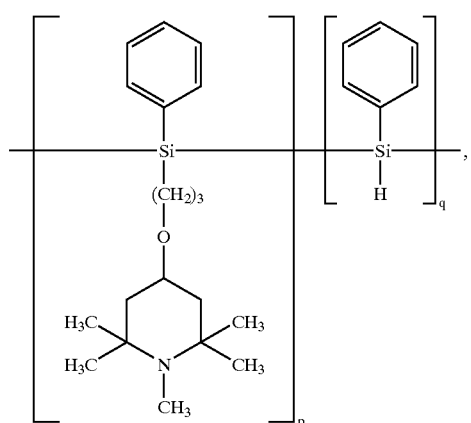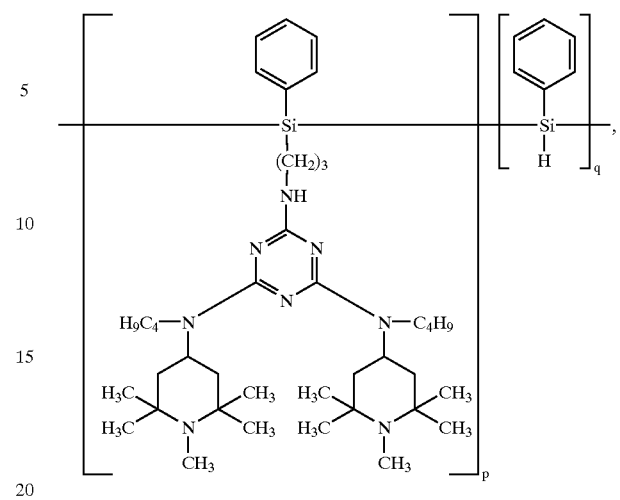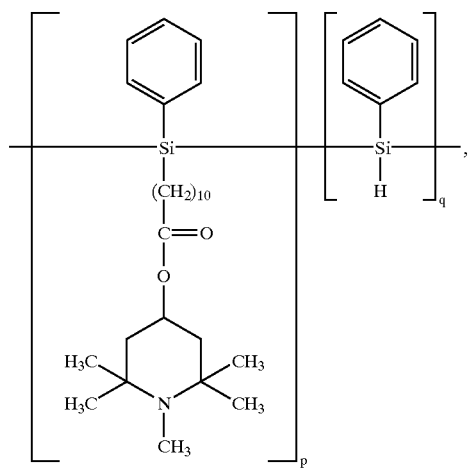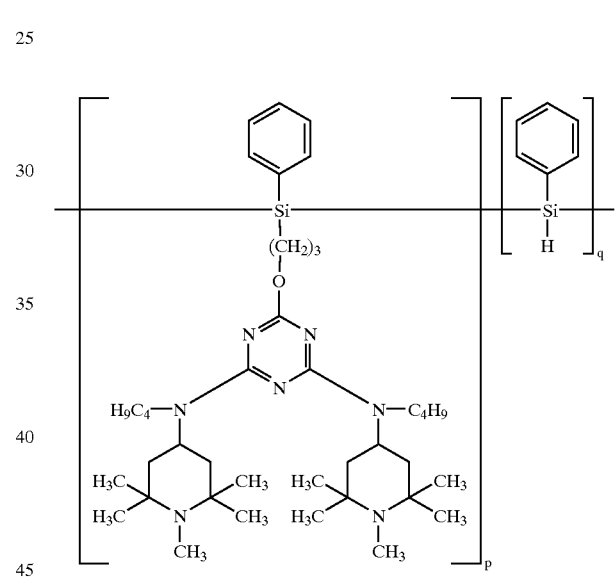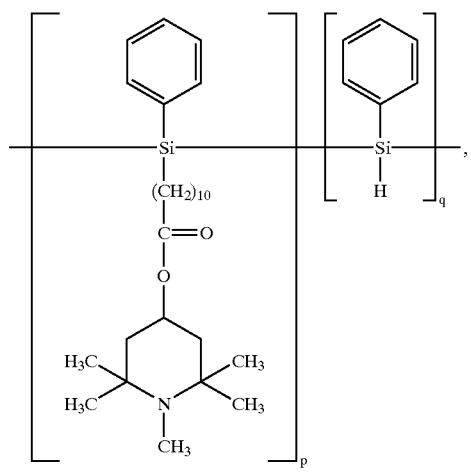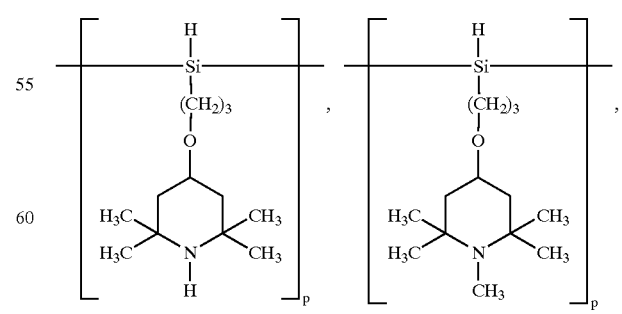

-continued

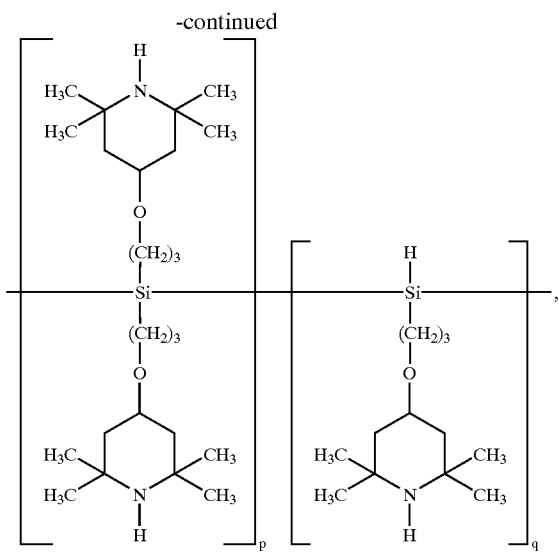

,

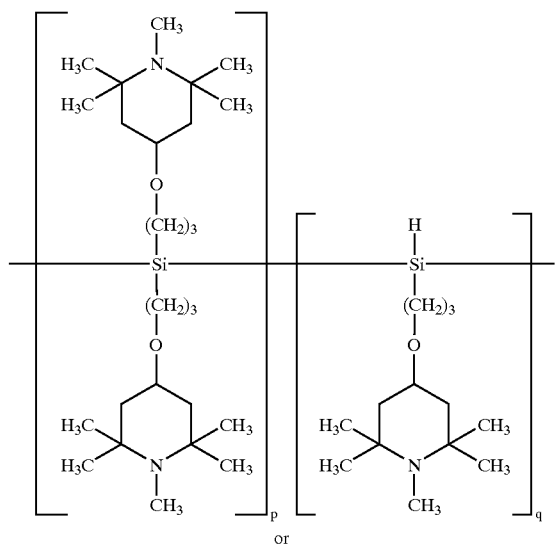

or

-continued

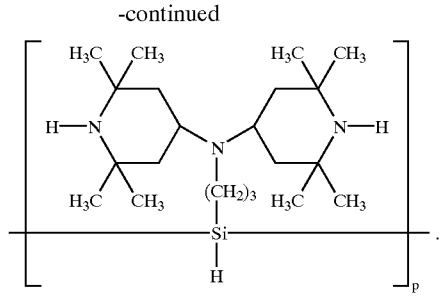

.

15. A composition containing an organic material susceptible to degradation induced by light, heat or oxidation and at least one compound according to claim 1.

16. A composition according to claim 15 wherein the organic material is a synthetic polymer.

17. A composition according to claim 15 wherein the organic material is polyethylene or polypropylene.

18. A method for stabilizing an organic material against degradation induced by light, heat or oxidation, which comprises incorporating into said organic material at least one compound according to claim 1.

* * * * *